(12) United States Patent
Liess

(10) Patent No.: US 10,745,978 B2
(45) Date of Patent: Aug. 18, 2020

(54) DOWNHOLE TOOL COUPLING SYSTEM

(71) Applicant: Weatherford Technology Holdings, LLC, Houston, TX (US)

(72) Inventor: Martin Liess, Seelze (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 131 days.

(21) Appl. No.: 15/670,897

(22) Filed: Aug. 7, 2017

(65) Prior Publication Data

US 2019/0040914 A1  Feb. 7, 2019

(51) Int. Cl.
| | |
|---|---|
| *E21B 17/046* | (2006.01) |
| *F16D 1/112* | (2006.01) |
| *E21B 19/16* | (2006.01) |
| *E21B 3/02* | (2006.01) |

(52) U.S. Cl.
CPC ............ *E21B 17/046* (2013.01); *E21B 19/16* (2013.01); *F16D 1/112* (2013.01); *E21B 3/02* (2013.01)

(58) Field of Classification Search
CPC ........ E21B 17/046; E21B 19/06; E21B 19/16; E21B 3/02; E21B 17/04
See application file for complete search history.

(56) References Cited

U.S. PATENT DOCUMENTS

| | | | |
|---|---|---|---|
| 1,367,156 A | 2/1921 | McAlvay et al. | |
| 1,610,977 A | 12/1926 | Scott | |
| 1,822,444 A | 9/1931 | MacClatchie | |
| 2,370,354 A | 2/1945 | Hurst | |
| 3,096,999 A | * 7/1963 | Ahlstone | E21B 33/038 |
| | | | 166/340 |
| 3,147,992 A | 9/1964 | Haeber et al. | |
| 3,354,951 A | 11/1967 | Savage et al. | |
| 3,385,370 A | 5/1968 | Knox et al. | |
| 3,662,842 A | 5/1972 | Bromell | |
| 3,698,426 A | 10/1972 | Litchfield et al. | |
| 3,747,675 A | 7/1973 | Brown | |
| 3,766,991 A | 10/1973 | Brown | |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

A123 System; 14Ah Prismatic Pouch Cell; Nanophosphate® Lithium-Ion; www.a123systems.com; date unknown; 1 page.

(Continued)

*Primary Examiner* — Jennifer H Gay
(74) *Attorney, Agent, or Firm* — Patterson + Sheridan, LLP

(57) ABSTRACT

A downhole tool coupling system, comprising a drive stem, a sleeve, and a plurality of locking clamps. The sleeve is longitudinally movable relative to the drive stem. The locking clamps are at least partially encompassed by the sleeve. The locking clamps are adjustable between an open position and a locked position. The sleeve is oriented relative to the locking clamps to adjust the locking clamps from the open position to the locked position as the sleeve moves longitudinally from an upper position to a lower position. Each locking clamp has an interior recessed region configured to clamp the drive stem to a tool stem when in the locked position.

18 Claims, 20 Drawing Sheets

(56) References Cited

U.S. PATENT DOCUMENTS

| | | |
|---|---|---|
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,433,859 A * | 2/1984 | Driver ............... E21B 33/038 285/315 |
| 4,449,596 A | 5/1984 | Boyadjieff |
| 4,478,244 A | 10/1984 | Garrett |
| 4,496,172 A * | 1/1985 | Walker ............... F16L 37/002 285/18 |
| 4,497,224 A | 2/1985 | Jürgens |
| 4,557,508 A * | 12/1985 | Walker ............... E21B 33/038 285/84 |
| 4,593,773 A | 6/1986 | Skeie |
| 4,693,497 A * | 9/1987 | Pettus ............... E21B 33/038 285/12 |
| 4,708,376 A * | 11/1987 | Jennings ............ E21B 33/038 285/18 |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,267,621 A * | 12/1993 | Deken ............... E21B 3/02 175/320 |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A * | 8/2000 | Giovanni ............ E21B 19/16 166/77.51 |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |

(56) References Cited

U.S. PATENT DOCUMENTS

| | | | |
|---|---|---|---|
| 7,281,587 B2 | 10/2007 | Haugen | |
| 7,284,617 B2 * | 10/2007 | Pietras | E21B 19/07 166/382 |
| 7,303,022 B2 | 12/2007 | Tilton et al. | |
| 7,325,610 B2 | 2/2008 | Giroux et al. | |
| 7,341,281 B2 * | 3/2008 | Guesnon | F16L 37/107 285/81 |
| 7,353,880 B2 | 4/2008 | Pietras | |
| 7,448,456 B2 | 11/2008 | Shahin et al. | |
| 7,451,826 B2 | 11/2008 | Pietras | |
| 7,490,677 B2 | 2/2009 | Buytaert et al. | |
| 7,503,397 B2 | 3/2009 | Giroux et al. | |
| 7,509,722 B2 | 3/2009 | Shahin et al. | |
| 7,513,300 B2 | 4/2009 | Pietras et al. | |
| 7,591,304 B2 | 9/2009 | Juhasz et al. | |
| 7,617,866 B2 | 11/2009 | Pietras | |
| 7,635,026 B2 | 12/2009 | Mosing et al. | |
| 7,665,515 B2 | 2/2010 | Mullins | |
| 7,665,530 B2 | 2/2010 | Wells et al. | |
| 7,665,531 B2 | 2/2010 | Pietras | |
| 7,669,662 B2 * | 3/2010 | Pietras | E21B 19/06 166/381 |
| 7,690,422 B2 | 4/2010 | Swietlik et al. | |
| 7,694,730 B2 | 4/2010 | Angman | |
| 7,694,744 B2 | 4/2010 | Shahin | |
| 7,699,121 B2 | 4/2010 | Juhasz et al. | |
| 7,712,523 B2 | 5/2010 | Snider et al. | |
| 7,730,698 B1 | 6/2010 | Montano et al. | |
| 7,757,759 B2 | 7/2010 | Jahn et al. | |
| 7,779,922 B1 | 8/2010 | Harris et al. | |
| 7,793,719 B2 | 9/2010 | Snider et al. | |
| 7,817,062 B1 | 10/2010 | Li et al. | |
| 7,828,085 B2 | 11/2010 | Kuttel et al. | |
| 7,841,415 B2 | 11/2010 | Winter | |
| 7,854,265 B2 | 12/2010 | Zimmermann | |
| 7,866,390 B2 | 1/2011 | Latiolais, Jr. et al. | |
| 7,874,352 B2 | 1/2011 | Odell, II et al. | |
| 7,874,361 B2 | 1/2011 | Mosing et al. | |
| 7,878,237 B2 | 2/2011 | Angman | |
| 7,878,254 B2 | 2/2011 | Abdollahi et al. | |
| 7,882,902 B2 | 2/2011 | Boutwell, Jr. | |
| 7,896,084 B2 | 3/2011 | Haugen | |
| 7,918,273 B2 | 4/2011 | Snider et al. | |
| 7,958,787 B2 | 6/2011 | Hunter | |
| 7,971,637 B2 | 7/2011 | Duhon et al. | |
| 7,975,768 B2 | 7/2011 | Fraser et al. | |
| 8,118,106 B2 | 2/2012 | Wiens et al. | |
| 8,141,642 B2 | 3/2012 | Olstad et al. | |
| 8,210,268 B2 | 7/2012 | Heidecke et al. | |
| 8,281,856 B2 | 10/2012 | Jahn et al. | |
| 8,307,903 B2 | 11/2012 | Redlinger et al. | |
| 8,365,834 B2 | 2/2013 | Liess et al. | |
| 8,459,361 B2 | 6/2013 | Leuchtenberg | |
| 8,505,984 B2 | 8/2013 | Henderson et al. | |
| 8,567,512 B2 | 10/2013 | Odell, II et al. | |
| 8,601,910 B2 | 12/2013 | Begnaud | |
| 8,636,067 B2 | 1/2014 | Robichaux et al. | |
| 8,651,175 B2 | 2/2014 | Fallen | |
| 8,668,003 B2 | 3/2014 | Osmundsen et al. | |
| 8,708,055 B2 | 4/2014 | Liess et al. | |
| 8,727,021 B2 | 5/2014 | Heidecke et al. | |
| 8,776,898 B2 | 7/2014 | Liess et al. | |
| 8,783,339 B2 | 7/2014 | Sinclair et al. | |
| 8,839,884 B2 | 9/2014 | Kuttel et al. | |
| 8,893,772 B2 | 11/2014 | Henderson et al. | |
| 9,045,960 B2 * | 6/2015 | Vanderford | E21B 23/00 |
| 9,068,406 B2 | 6/2015 | Clasen et al. | |
| 9,206,851 B2 | 12/2015 | Slaughter, Jr. et al. | |
| 9,528,326 B2 | 12/2016 | Heidecke et al. | |
| 9,617,819 B2 * | 4/2017 | Older | E21B 33/038 |
| 9,631,438 B2 | 4/2017 | McKay | |
| 9,689,211 B2 * | 6/2017 | Joensen | E21B 33/038 |
| 10,094,501 B2 * | 10/2018 | Bull | E21B 33/038 |
| 10,156,114 B2 * | 12/2018 | Partridge | F16L 1/26 |
| 2002/0043403 A1 | 4/2002 | Juhasz et al. | |
| 2002/0074132 A1 | 6/2002 | Juhasz et al. | |
| 2002/0084069 A1 | 7/2002 | Mosing et al. | |
| 2002/0129934 A1 | 9/2002 | Mullins et al. | |
| 2002/0170720 A1 | 11/2002 | Haugen | |
| 2003/0098150 A1 | 5/2003 | Andreychuk | |
| 2003/0107260 A1 | 6/2003 | Ording et al. | |
| 2003/0221519 A1 | 12/2003 | Haugen | |
| 2004/0003490 A1 | 1/2004 | Shahin et al. | |
| 2004/0069497 A1 | 4/2004 | Jones et al. | |
| 2004/0216924 A1 | 11/2004 | Pietras et al. | |
| 2005/0000691 A1 | 1/2005 | Giroux et al. | |
| 2005/0173154 A1 | 8/2005 | Lesko | |
| 2005/0206163 A1 * | 9/2005 | Guesnon | F16L 37/107 285/402 |
| 2005/0257933 A1 * | 11/2005 | Pietras | E21B 19/07 166/380 |
| 2005/0269072 A1 | 12/2005 | Folk et al. | |
| 2005/0269104 A1 | 12/2005 | Folk et al. | |
| 2005/0269105 A1 | 12/2005 | Pietras | |
| 2005/0274508 A1 | 12/2005 | Folk et al. | |
| 2006/0000600 A1 * | 1/2006 | Pietras | E21B 19/06 166/77.52 |
| 2006/0037784 A1 | 2/2006 | Walter et al. | |
| 2006/0124353 A1 * | 6/2006 | Juhasz | E21B 19/07 175/40 |
| 2006/0151181 A1 | 7/2006 | Shahin | |
| 2006/0180315 A1 | 8/2006 | Shahin et al. | |
| 2007/0030167 A1 | 2/2007 | Li et al. | |
| 2007/0044973 A1 | 3/2007 | Fraser et al. | |
| 2007/0074588 A1 | 4/2007 | Harata et al. | |
| 2007/0074874 A1 | 4/2007 | Richardson | |
| 2007/0102992 A1 | 5/2007 | Jager | |
| 2007/0131416 A1 | 6/2007 | Odell, II et al. | |
| 2007/0140801 A1 | 6/2007 | Kuttel et al. | |
| 2007/0144730 A1 | 6/2007 | Shahin et al. | |
| 2007/0158076 A1 | 7/2007 | Hollingsworth, Jr. et al. | |
| 2007/0251699 A1 | 11/2007 | Wells et al. | |
| 2007/0251701 A1 | 11/2007 | Jahn et al. | |
| 2007/0257811 A1 | 11/2007 | Hall et al. | |
| 2008/0059073 A1 | 3/2008 | Giroux et al. | |
| 2008/0093127 A1 | 4/2008 | Angman | |
| 2008/0099196 A1 | 5/2008 | Latiolais et al. | |
| 2008/0125876 A1 | 5/2008 | Boutwell | |
| 2008/0202812 A1 | 8/2008 | Childers et al. | |
| 2008/0308281 A1 | 12/2008 | Boutwell, Jr. et al. | |
| 2009/0151934 A1 | 6/2009 | Heidecke et al. | |
| 2009/0159294 A1 | 6/2009 | Abdollahi et al. | |
| 2009/0200038 A1 | 8/2009 | Swietlik et al. | |
| 2009/0205820 A1 | 8/2009 | Koederitz et al. | |
| 2009/0205827 A1 | 8/2009 | Swietlik et al. | |
| 2009/0205836 A1 | 8/2009 | Swietlik et al. | |
| 2009/0205837 A1 | 8/2009 | Swietlik et al. | |
| 2009/0229837 A1 | 9/2009 | Wiens et al. | |
| 2009/0266532 A1 | 10/2009 | Revheim et al. | |
| 2009/0272537 A1 | 11/2009 | Alikin et al. | |
| 2009/0274544 A1 | 11/2009 | Liess | |
| 2009/0274545 A1 | 11/2009 | Liess et al. | |
| 2009/0316528 A1 | 12/2009 | Ramshaw et al. | |
| 2009/0321086 A1 | 12/2009 | Zimmermann | |
| 2010/0032162 A1 | 2/2010 | Olstad et al. | |
| 2010/0101805 A1 | 4/2010 | Angelle et al. | |
| 2010/0200222 A1 | 8/2010 | Robichaux et al. | |
| 2010/0206552 A1 | 8/2010 | Wollum | |
| 2010/0206583 A1 * | 8/2010 | Swietlik | E21B 17/02 166/380 |
| 2010/0206584 A1 | 8/2010 | Clubb et al. | |
| 2010/0236777 A1 | 9/2010 | Partouche et al. | |
| 2011/0036586 A1 | 2/2011 | Hart et al. | |
| 2011/0039086 A1 | 2/2011 | Graham et al. | |
| 2011/0088495 A1 | 4/2011 | Buck et al. | |
| 2011/0214919 A1 | 9/2011 | McClung, III | |
| 2011/0280104 A1 | 11/2011 | McClung, III | |
| 2012/0048574 A1 | 3/2012 | Wiens et al. | |
| 2012/0152530 A1 | 6/2012 | Wiedecke et al. | |
| 2012/0160517 A1 | 6/2012 | Bouligny et al. | |
| 2012/0212326 A1 | 8/2012 | Christiansen et al. | |
| 2012/0234107 A1 | 9/2012 | Pindiprolu et al. | |
| 2012/0298376 A1 | 11/2012 | Twardowski | |

(56) References Cited

U.S. PATENT DOCUMENTS

| | | | |
|---|---|---|---|
| 2013/0020095 A1* | 1/2013 | Vanderford | E21B 23/00 166/382 |
| 2013/0055858 A1 | 3/2013 | Richardson | |
| 2013/0056977 A1 | 3/2013 | Henderson et al. | |
| 2013/0062074 A1 | 3/2013 | Angelle et al. | |
| 2013/0075077 A1 | 3/2013 | Henderson et al. | |
| 2013/0075106 A1 | 3/2013 | Tran et al. | |
| 2013/0105178 A1 | 5/2013 | Pietras | |
| 2013/0207382 A1 | 8/2013 | Robichaux | |
| 2013/0207388 A1 | 8/2013 | Jansson et al. | |
| 2013/0233624 A1 | 9/2013 | In | |
| 2013/0269926 A1 | 10/2013 | Liess et al. | |
| 2013/0271576 A1 | 10/2013 | Elllis | |
| 2013/0275100 A1 | 10/2013 | Ellis et al. | |
| 2013/0299247 A1 | 11/2013 | Küttel et al. | |
| 2014/0090856 A1 | 4/2014 | Pratt et al. | |
| 2014/0116686 A1 | 5/2014 | Odell, II et al. | |
| 2014/0131052 A1 | 5/2014 | Richardson | |
| 2014/0202767 A1 | 7/2014 | Feasey | |
| 2014/0233804 A1 | 8/2014 | Gustavsson et al. | |
| 2014/0262521 A1 | 9/2014 | Bradley et al. | |
| 2014/0305662 A1 | 10/2014 | Giroux et al. | |
| 2014/0326468 A1 | 11/2014 | Heidecke et al. | |
| 2014/0352944 A1 | 12/2014 | Devarajan et al. | |
| 2014/0360780 A1 | 12/2014 | Moss et al. | |
| 2015/0014063 A1 | 1/2015 | Simanjuntak et al. | |
| 2015/0053424 A1 | 2/2015 | Wiens et al. | |
| 2015/0069755 A1* | 3/2015 | Bull | E21B 33/038 285/406 |
| 2015/0083391 A1 | 3/2015 | Bangert et al. | |
| 2015/0107385 A1 | 4/2015 | Mullins et al. | |
| 2015/0218894 A1 | 8/2015 | Slack | |
| 2015/0337648 A1 | 11/2015 | Zippel et al. | |
| 2016/0024862 A1 | 1/2016 | Wilson et al. | |
| 2016/0138348 A1 | 5/2016 | Kunec | |
| 2016/0145954 A1 | 5/2016 | Helms et al. | |
| 2016/0177639 A1 | 6/2016 | McIntosh et al. | |
| 2016/0215592 A1 | 7/2016 | Helms et al. | |
| 2016/0230481 A1 | 8/2016 | Misson et al. | |
| 2016/0376863 A1* | 12/2016 | Older | E21B 33/038 166/368 |
| 2017/0037683 A1 | 2/2017 | Heidecke et al. | |
| 2017/0044854 A1 | 2/2017 | Hebebrand et al. | |
| 2017/0044875 A1 | 2/2017 | Hebebrand et al. | |
| 2017/0051568 A1 | 2/2017 | Wern et al. | |
| 2017/0067303 A1 | 3/2017 | Thiemann et al. | |
| 2017/0067320 A1* | 3/2017 | Zouhair | E21B 41/00 |
| 2017/0074075 A1* | 3/2017 | Liess | E21B 17/046 |
| 2017/0211327 A1 | 7/2017 | Wern et al. | |
| 2017/0211343 A1 | 7/2017 | Thiemann | |
| 2017/0284164 A1 | 10/2017 | Holmes et al. | |
| 2017/0328164 A1* | 11/2017 | Partridge | F16L 1/26 |
| 2018/0245433 A1* | 8/2018 | Fuehring | E21B 3/02 |
| 2018/0372254 A1* | 12/2018 | Bull | E21B 33/038 |
| 2019/0040914 A1* | 2/2019 | Liess | E21B 17/046 |
| 2019/0106977 A1* | 4/2019 | Amezaga | E21B 3/02 |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2944327 A1 | 10/2015 |
| DE | 102007016822 A1 | 10/2008 |
| EP | 0 250 072 A2 | 12/1987 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 2085566 A2 | 8/2009 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |
| WO | 2016197255 A1 | 12/2016 |
| WO | 2017/044384 A1 | 3/2017 |

OTHER PUBLICATIONS

Streicher Load/Torque Cell Systems; date unknown; 1 page.

3PS, Inc.; Enhanced Torque and Tension Sub with Integrated Turns; date unknown; 2 total pages.

Lefevre, et al.; Drilling Technology; Deeper, more deviated wells push development of smart drill stem rotary shouldered connections; dated 2008; 2 total pages.

PCT Invitaiton to Pay Additional Fees for International Application No. PCT/US2008/086699; dated Sep. 9, 2009; 7 total pages.

PCT Notification of Transmittal of the International Search Report and the Written Opinion of the International Searching Authority for International Application No. PCT/US2008/086699; dated Sep. 11, 2009; 19 total pages.

National Oilwell Varco; Rotary Shoulder Handbook; dated 2010; 116 total pages.

Weatherford; TorkSub™ Stand-Alone Torque Measuring System; dated 2011-2014; 4 total pages.

Australian Examination Report for Application No. 2008334992; dated Apr. 5, 2011; 2 total pages.

European Search Report for Application No. 08 860 261.0-2315; dated Apr. 12, 2011; 4 total pages.

Eaton; Spool Valve Hydraulic Motors; dated Sep. 2011; 16 total pages.

European Extended Search Report for Application No. 12153779.9-2315; dated Apr. 5, 2012; 4 total pages.

Australian Examination Report for Application No. 2012201644; dated May 15, 2013; 3 total pages.

Warrior; 250E Electric Top Drive (250-TON); 250H Hydraulic Top Drive (250-TON); dated Apr. 2014; 4 total pages.

Hydraulic Pumps & Motors; Fundamentals of Hydraulic Motors; dated Jun. 26, 2014; 6 total pages.

Warrior; Move Pipe Better; 500E Electric Top Drive (500 ton-1000 hp); dated May 2015; 4 total pages.

Canadian Office Action for Application No. 2,837,581; dated Aug. 24, 2015; 3 total pages.

European Extended Search Report for Application No. 15166062.8-1610; dated Nov. 23, 2015; 6 total pages.

Australian Examination Report for Application No. 2014215938; dated Feb. 4, 2016; 3 total pages.

Rexroth; Bosch Group; Motors and Gearboxes; Asynchronous high-speed motors 1 MB for high speeds; dated Apr. 13, 2016; 6 total pages.

Canadian Office Action for Application No. 2,837,581; dated Apr. 25, 2016; 3 total pages.

PCT Notification of Transmittal of the International Search Report and the Written Opinion of the International Searching Authority for International Application No. PCT/US2015/061960; dated Jul. 25, 2016; 16 total pages.

PCT Notification of Transmittal of the International Search Report and the Written Opinion of the International Searching Authority for International Application No. PCT/US2016/049462; dated Nov. 22, 2016; 14 total pages.

(56) References Cited

OTHER PUBLICATIONS

PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
EPO Extended European Search Report dated Jun. 6, 2018, for European Application No. 18157915.2.
EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
PCT International Search Report and Written Opinion dated Oct. 23, 2018, for International Application No. PCT/US2018/044162.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 181580507.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoilLOK™ Brochure, "Highest integrity hand-held coiled tubing handling tools," 2 pages.
Peters; Tool Coupler for Use With a Top Drive; U.S. Appl. No. 15/656,508, filed Jul. 21, 2017. Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to Ids.).
Liess; Downhole Tool Coupling System; U.S. Appl. No. 15/670,897, filed Aug. 7, 2017. Application not attached to Ids.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. No. 15/806,560, filed Nov. 8, 2017. (Application not attached to IDS).

* cited by examiner

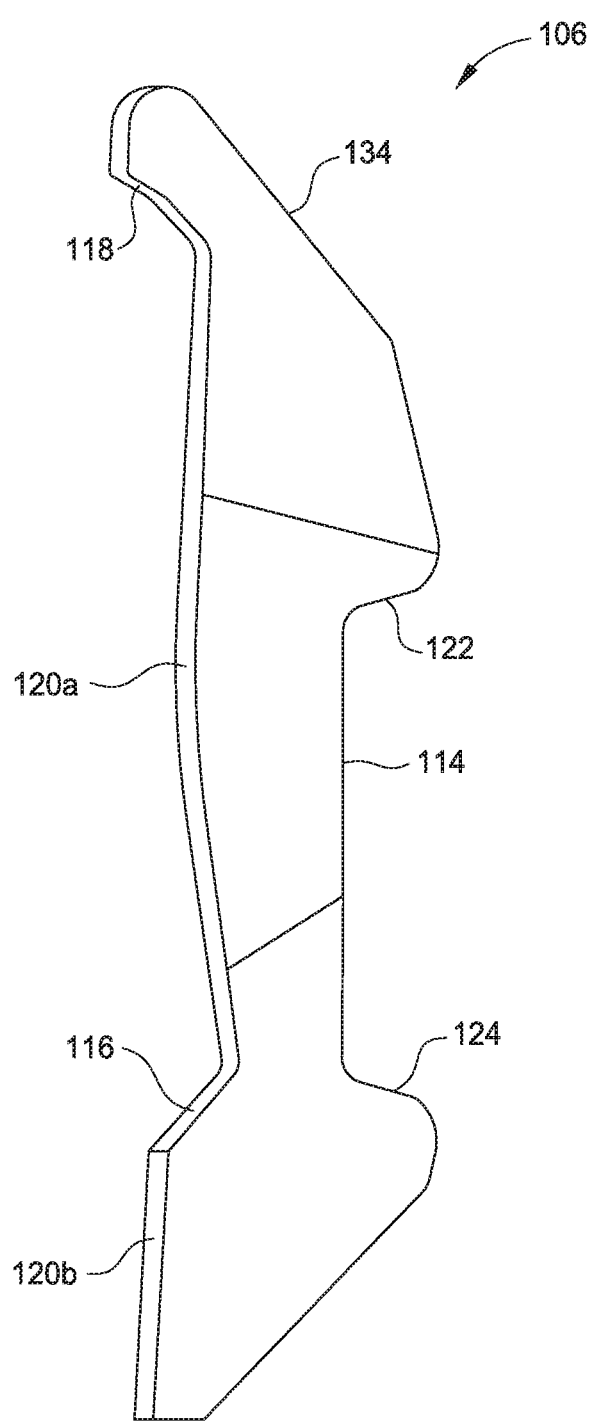

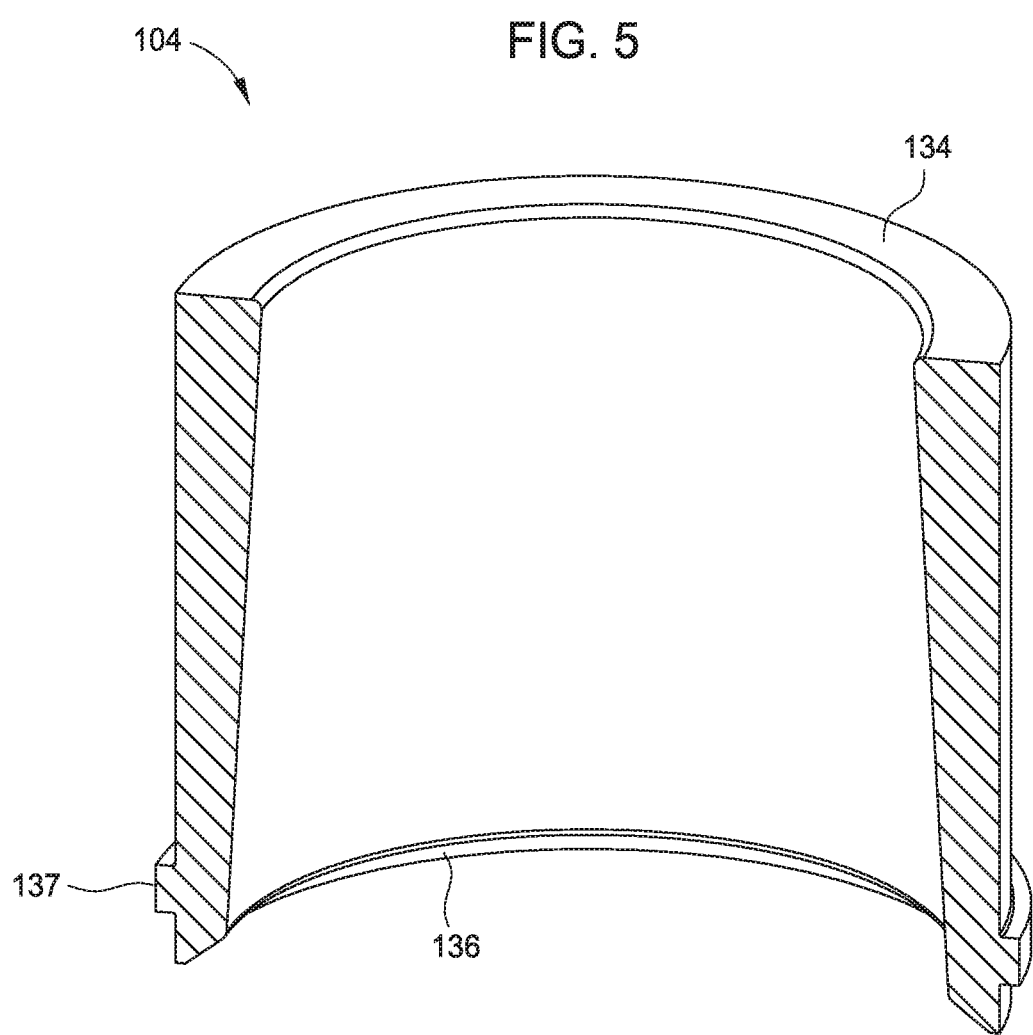

FIG. 6A
FIG. 6B
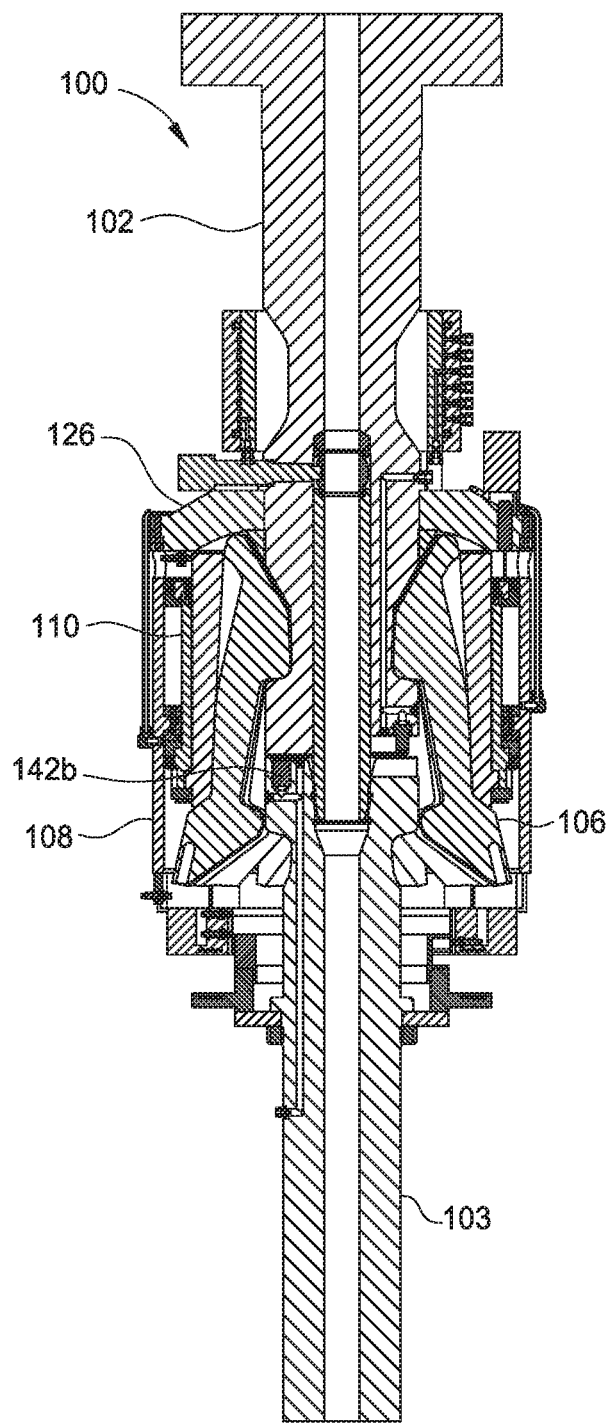
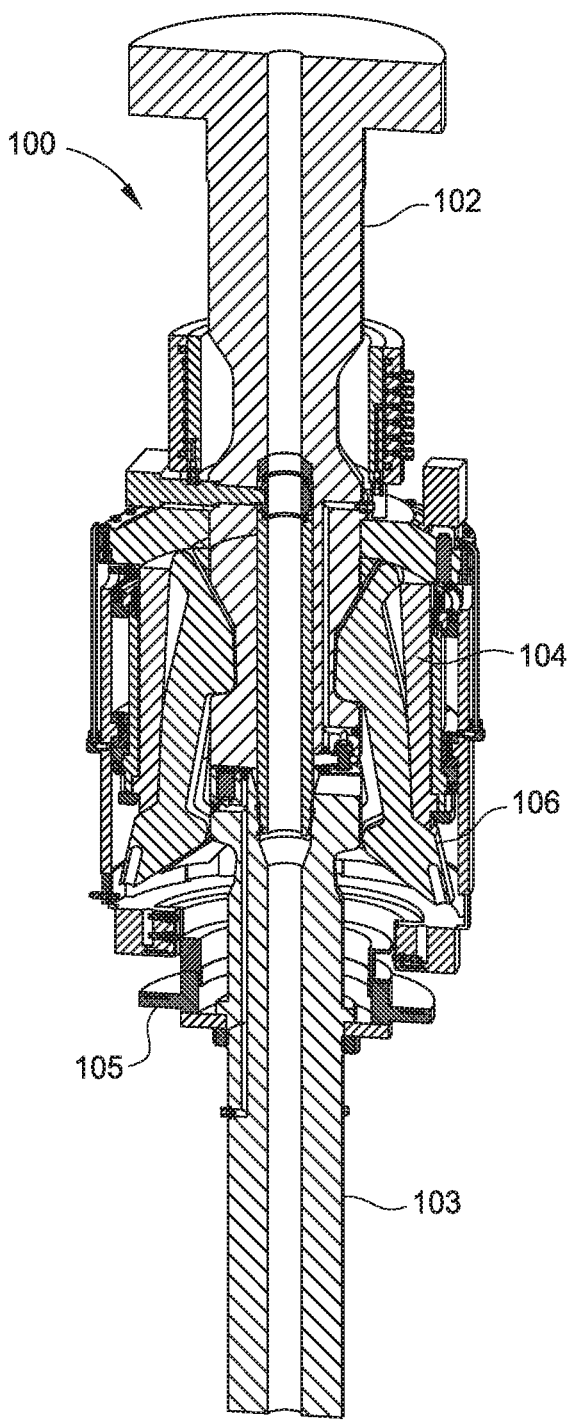

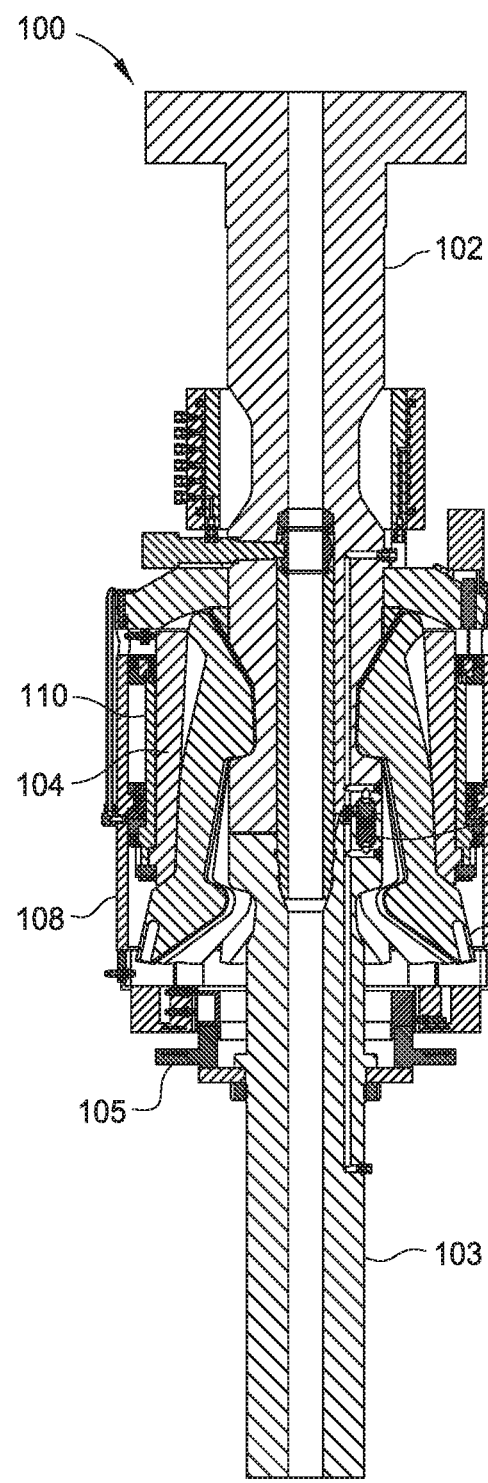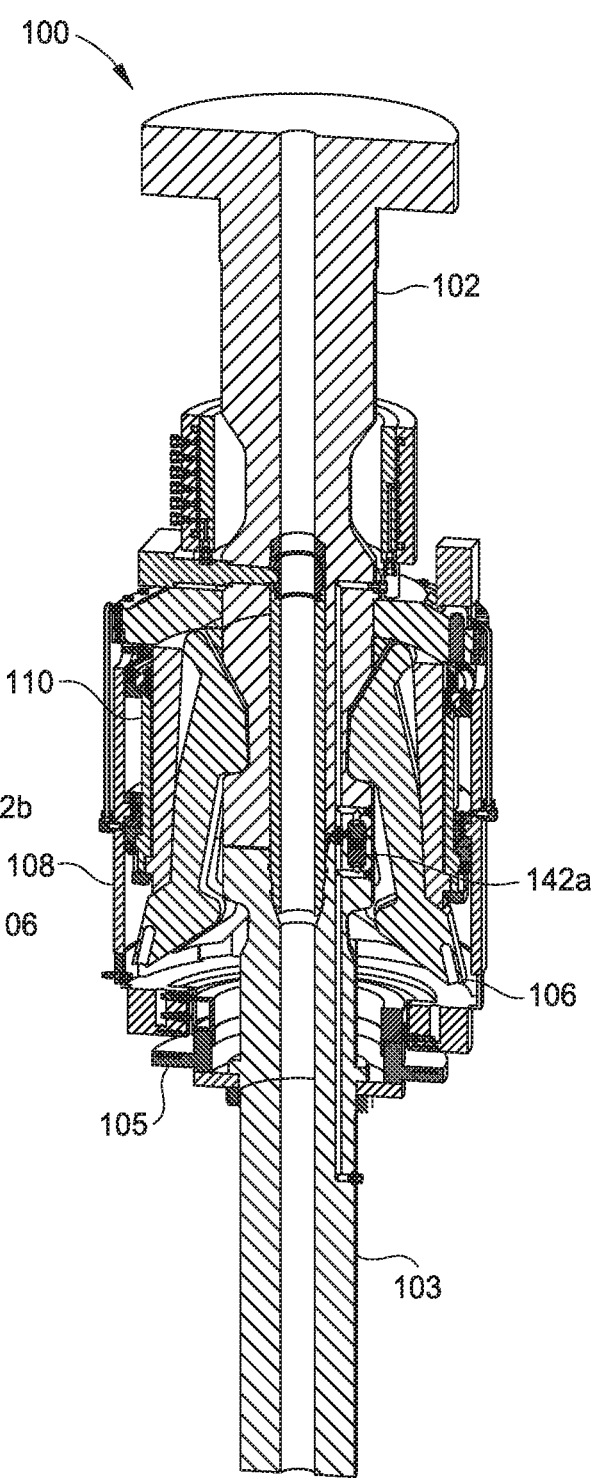

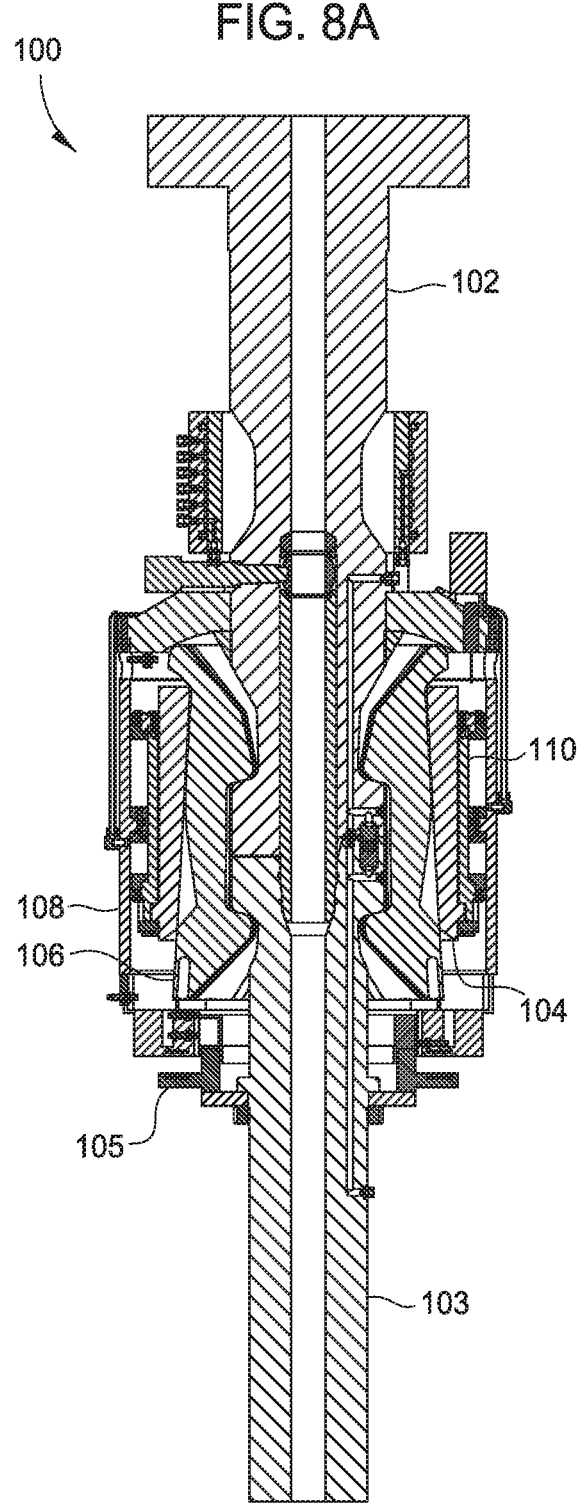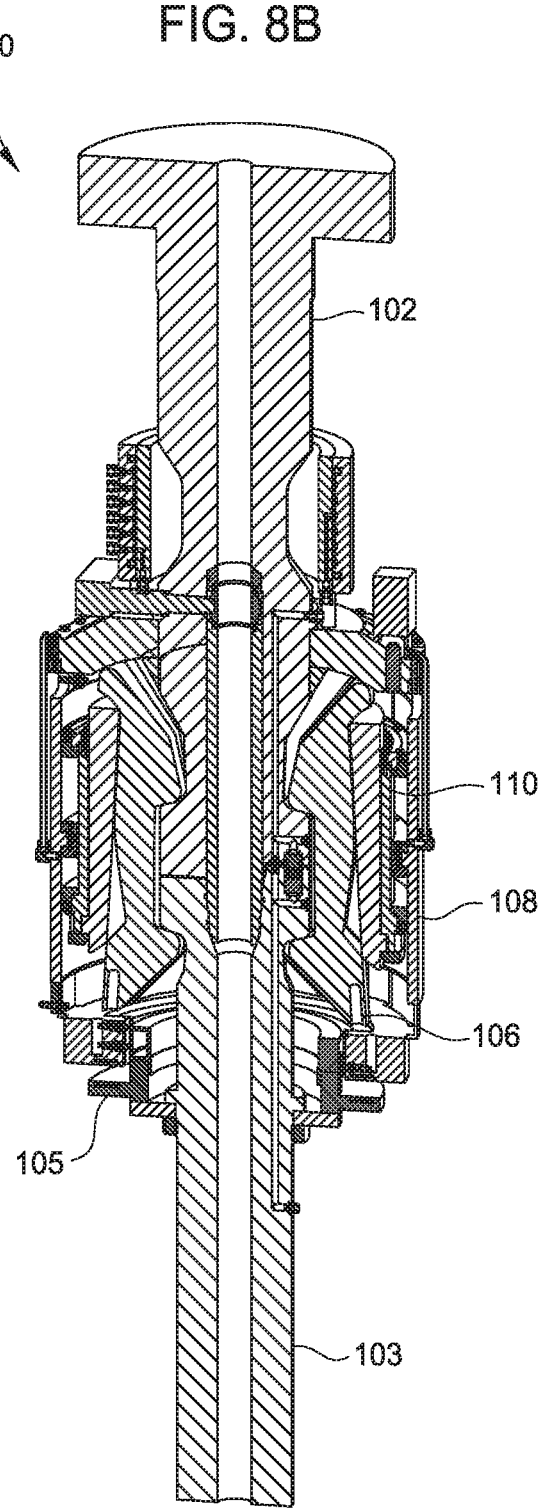

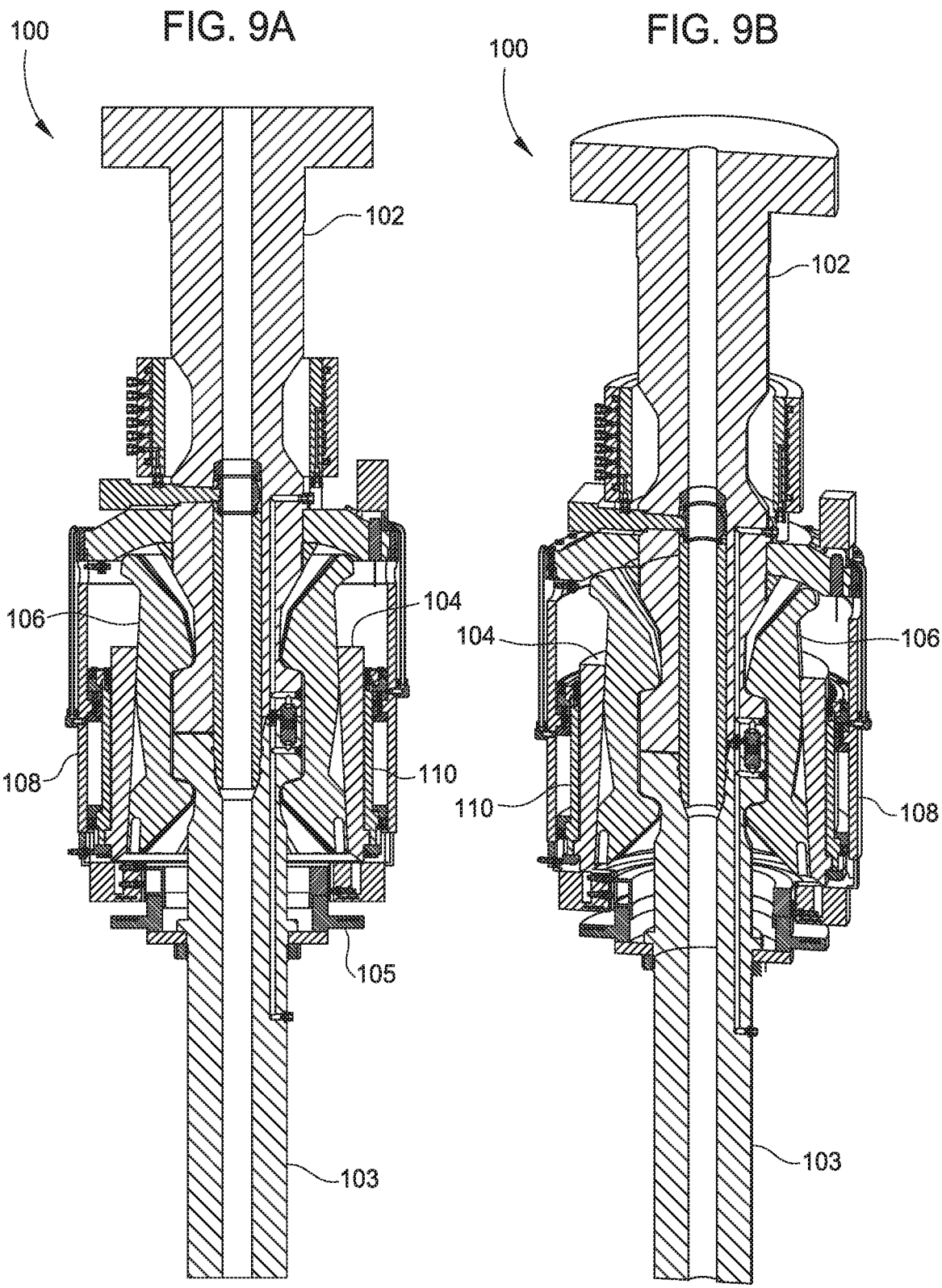

FIG. 10
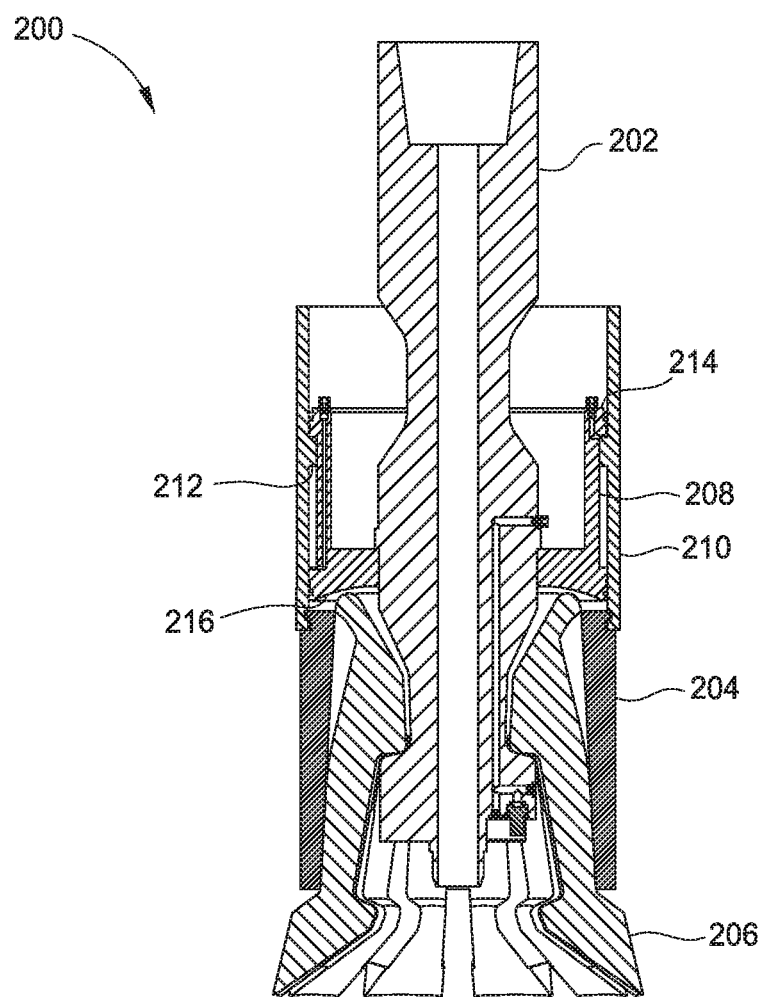
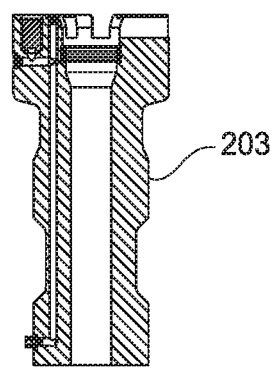

FIG. 13A
FIG. 13B
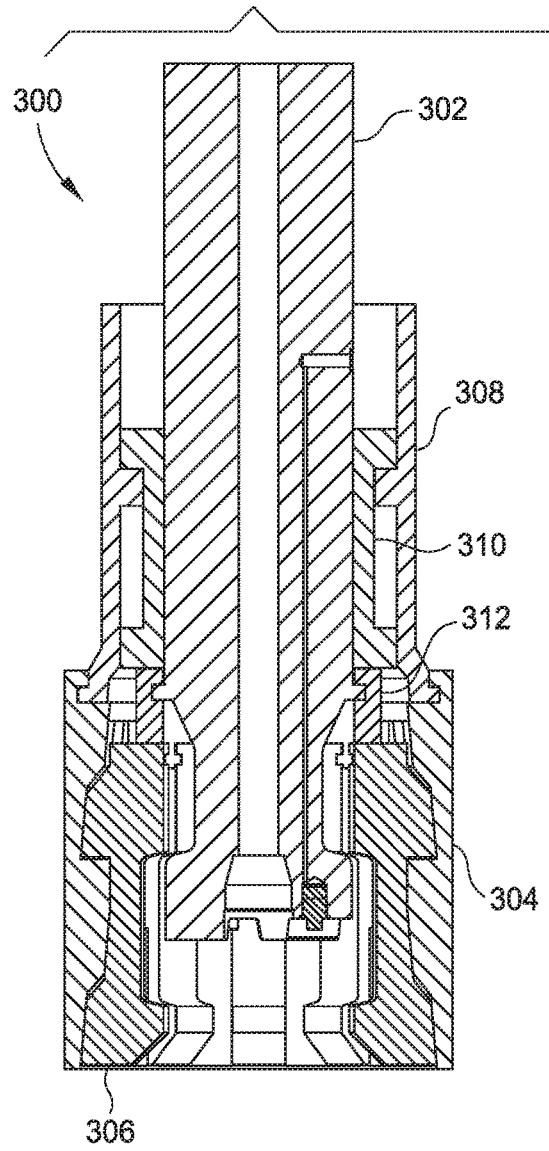
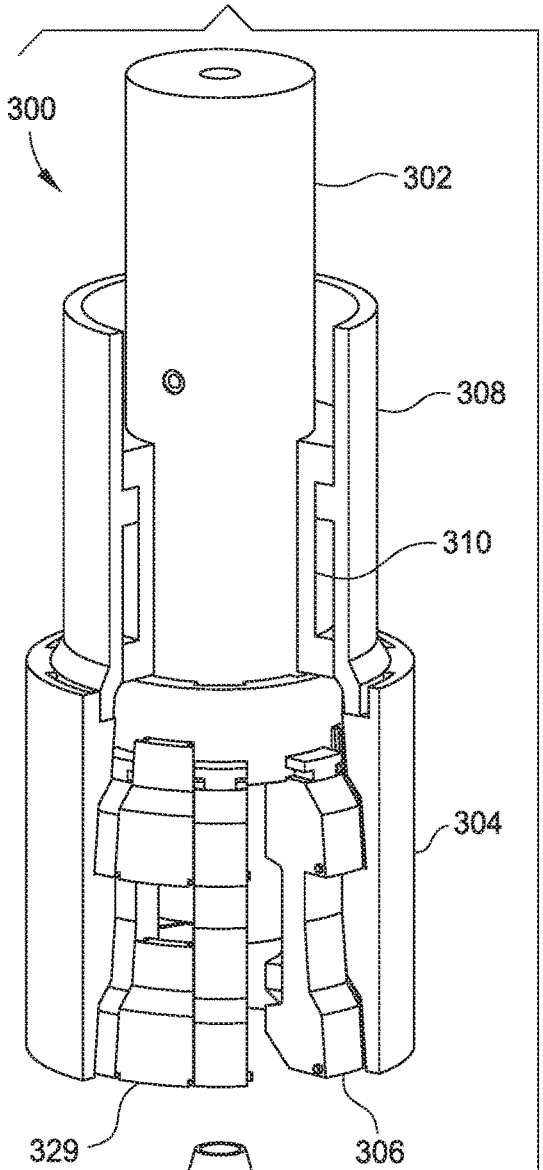

FIG. 16A
FIG. 16B
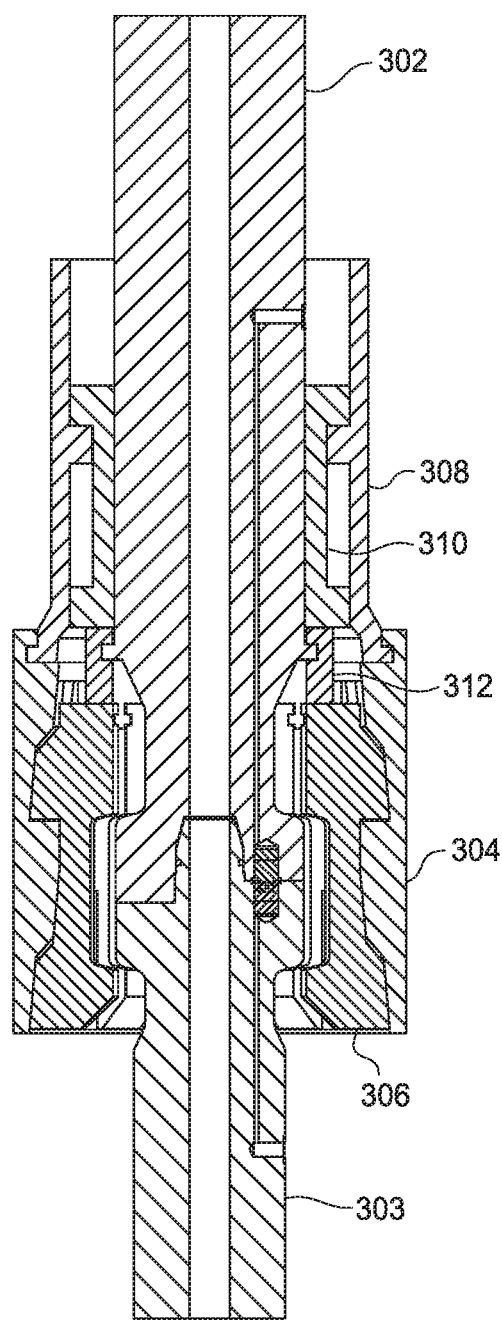
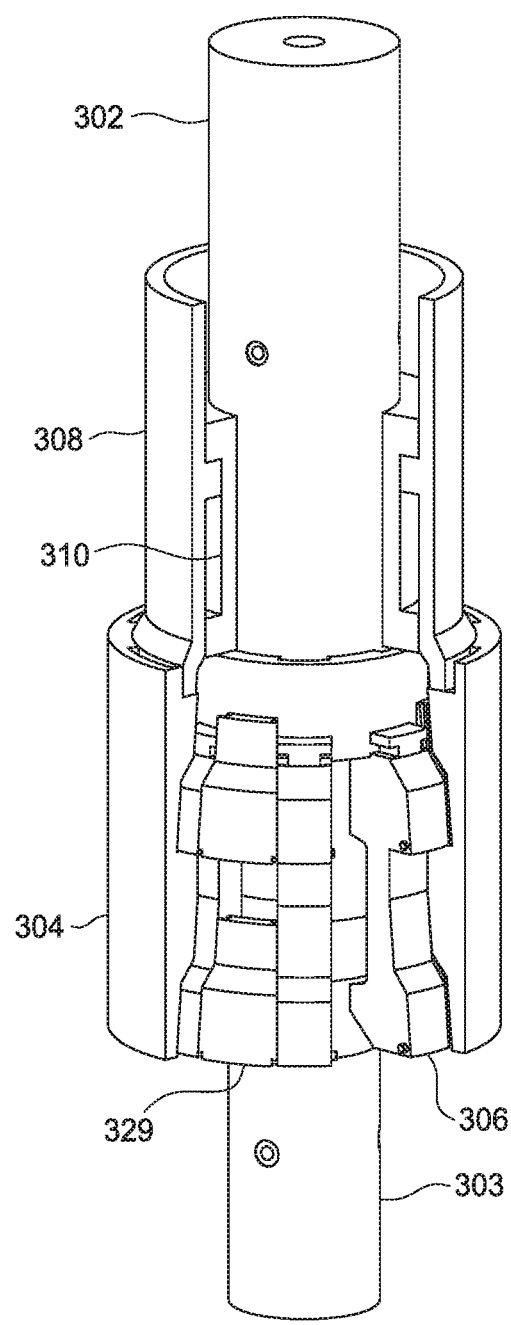

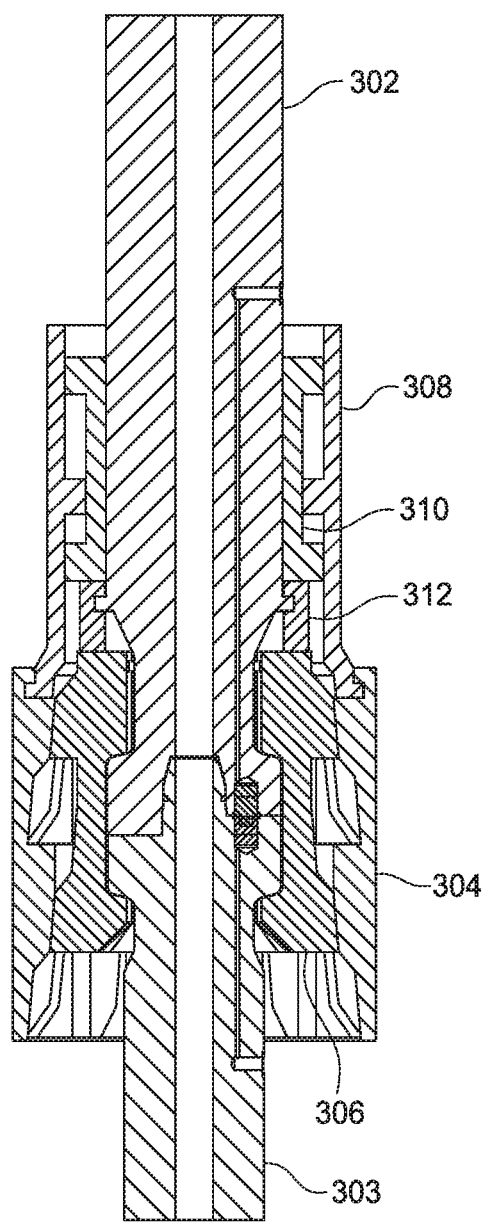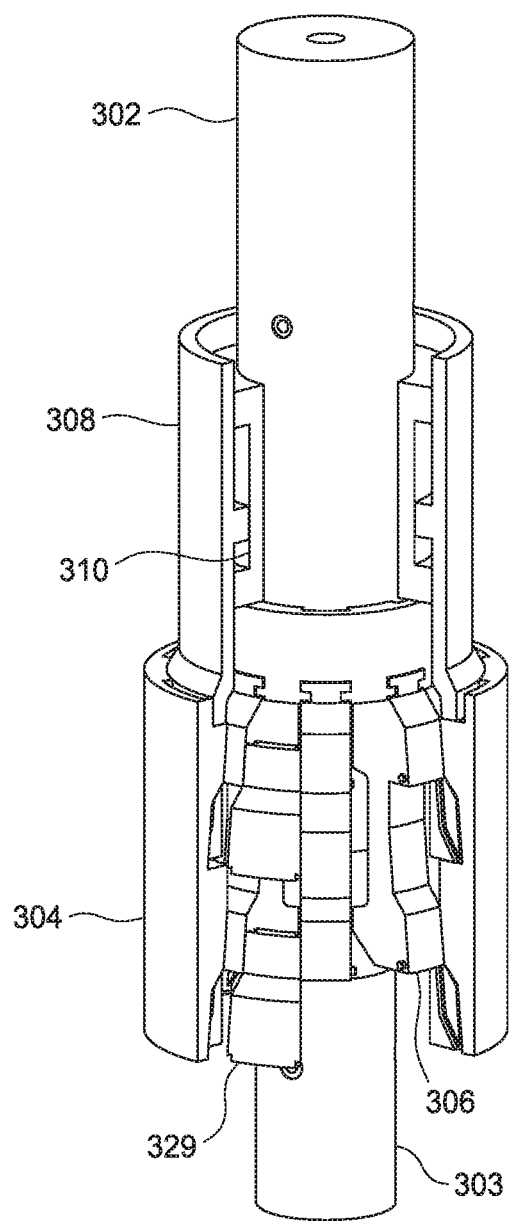

DOWNHOLE TOOL COUPLING SYSTEM

BACKGROUND

Embodiments of the present disclosure generally relate to equipment and methods for coupling a top drive to one or more tools. The coupling may transfer both axial load and torque bi-directionally from the top drive to the one or more tools.

A wellbore is formed to access hydrocarbon-bearing formations (e.g., crude oil and/or natural gas) or for geothermal power generation by the use of drilling. Drilling is accomplished by utilizing a drill bit that is mounted on the end of a tool string. To drill within the wellbore to a predetermined depth, the tool string is often rotated by a top drive on a drilling rig. After drilling to a predetermined depth, the tool string and drill bit are removed, and a string of casing is lowered into the wellbore. Well construction and completion operations may then be conducted.

During drilling and well construction/completion, various tools are used which have to be attached to the top drive. The process of changing tools is very time consuming and dangerous, requiring personnel to work at heights. The attachments between the tools and the top drive typically include mechanical, electrical, optical, hydraulic, and/or pneumatic connections, conveying torque, load, data, signals, and/or power.

Typically, sections of a tool string are connected together with threaded connections. Such threaded connections are capable of transferring load. Right-hand (RH) threaded connections are also capable of transferring RH torque. However, application of left-hand (LH) torque to a tool string with RH threaded connections (and vice versa) risks breaking the string. Methods have been employed to obtain bi-directional torque holding capabilities for connections. Some examples of these bi-directional setting devices include thread locking mechanisms for saver subs, hydraulic locking rings, set screws, jam nuts, lock washers, keys, cross/thru-bolting, lock wires, clutches and thread locking compounds. However, these solutions have shortcomings. For example, many of the methods used to obtain bi-directional torque capabilities are limited by friction between component surfaces or compounds that typically result in a relative low torque resistant connection. Locking rings may provide only limited torque resistance, and it may be difficult to fully monitor any problem due to limited accessibility and location. For applications that require high bi-directional torque capabilities, only positive locking methods such as keys, clutches or cross/through-bolting are typically effective. Further, some high bi-directional torque connections require both turning and milling operations to manufacture, which increase the cost of the connection over just a turning operation required to manufacture a simple male-to-female threaded connection. Some high bi-directional torque connections also require significant additional components as compared to a simple male-to-female threaded connection, which adds to the cost.

Safer, faster, more reliable, and more efficient connections that are capable of conveying load, data, signals, power and/or bi-directional torque between the tool string and the top drive are needed.

SUMMARY OF THE DISCLOSURE

The present disclosure generally relates to equipment and methods for coupling a top drive to one or more tools. The coupling may transfer both axial load and torque bi-directionally from the top drive to the one or more tools.

A downhole tool coupling system comprising a drive stem, a sleeve, and a plurality of locking clamps. The sleeve is longitudinally movable relative to the drive stem. The locking clamps are at least partially encompassed by the sleeve. The locking clamps are rotatable between an open position and a locked position. The sleeve is oriented relative to the locking clamps to rotate and radially move the locking clamps from the open position to the locked position as the sleeve moves longitudinally from a first position to a second position. Each locking clamp has an interior recessed region configured to clamp the drive stem to a tool stem when in the locked position.

A downhole tool coupling system comprising a drive stem, a sleeve, and a plurality of locking clamps. The sleeve is longitudinally movable relative to the drive stem. The locking clamps are at least partially encompassed by the sleeve. The locking clamps are radially movable between an open position and a locked position. The sleeve is oriented relative to the locking clamps to radially move the locking clamps from the open position to the locked position as the sleeve moves longitudinally from a first position to a second position. Each locking clamp has an interior recessed region configured to clamp the drive stem to a tool stem when in the locked position.

A method for connecting a drive stem and a tool stem includes moving a sleeve longitudinally relative to the drive stem from a first position to a second position, moving a plurality of locking clamps radially between an open position and a locked position as the sleeve moves from the first position to the second position, the plurality of locking clamps at least partially encompassed by the sleeve, and engaging the tool stem with the plurality of locking clamps, thereby connecting the drive stem to the tool stem in the locked position.

A method for connecting a drive stem and a tool stem includes moving a sleeve longitudinally relative to the drive stem from a first position to a second position, rotating a plurality of locking clamps radially between an open position and a locked position as the sleeve moves from the first position to the second position, the plurality of locking clamps at least partially encompassed by the sleeve, and engaging the tool stem with the plurality of locking clamps, thereby connecting the drive stem to the tool stem in the locked position.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates a locking clamp of the downhole tool system, according to one embodiment.

FIG. 5 illustrates a sleeve of the downhole tool system, according to one embodiment.

FIGS. 6A and 6B illustrate a cross-sectional view of the downhole tool system, according to one embodiment.

FIGS. 7A and 7B illustrate a cross-sectional view of the downhole tool system in an unlocked position, according to one embodiment.

FIGS. 8A and 8B illustrate a cross-sectional view of the downhole tool system in an intermediate position, according to one embodiment.

FIGS. 9A and 9B illustrate a cross-sectional view of the downhole tool system in a locked position, according to one embodiment.

FIG. 10 illustrates a cross-sectional view of a downhole tool system in a decoupled position, according to a second embodiment.

FIGS. 13A-B illustrate a downhole tool system in a decoupled position, according to a third embodiment.

FIGS. 16A and 16B illustrate a downhole tool system in an unlocked position, according to a third embodiment.

FIGS. 18A and 18B illustrate a downhole tool system in a locked position, according to a third embodiment.

DETAILED DESCRIPTION

In the description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a longitudinal axis of a wellbore, and "below", "lower", "downward" and similar terms refer to a direction away from the earth's surface along the longitudinal axis of the wellbore.

The present disclosure provides equipment and methods for coupling a top drive to one or more downhole tools. The downhole tool coupling system may transfer torque bi-directionally from the top drive to the one or more tools. The coupling system may provide mechanical, electrical, optical, hydraulic, and/or pneumatic connections. The coupling system may convey torque, load, data, signals, and/or power. For example, axial loads of tool strings may be expected to be several hundred tons, up to, including, and sometimes surpassing 750 tons. Required torque transmission may be tens of thousands of foot-pounds, up to, including, and sometimes surpassing 100 thousand foot-pounds. Embodiments disclosed herein may provide axial connection integrity, capable of supporting high axial loads, good sealability, resistance to bending, high flow rates, and high flow pressures.

Figure 1:
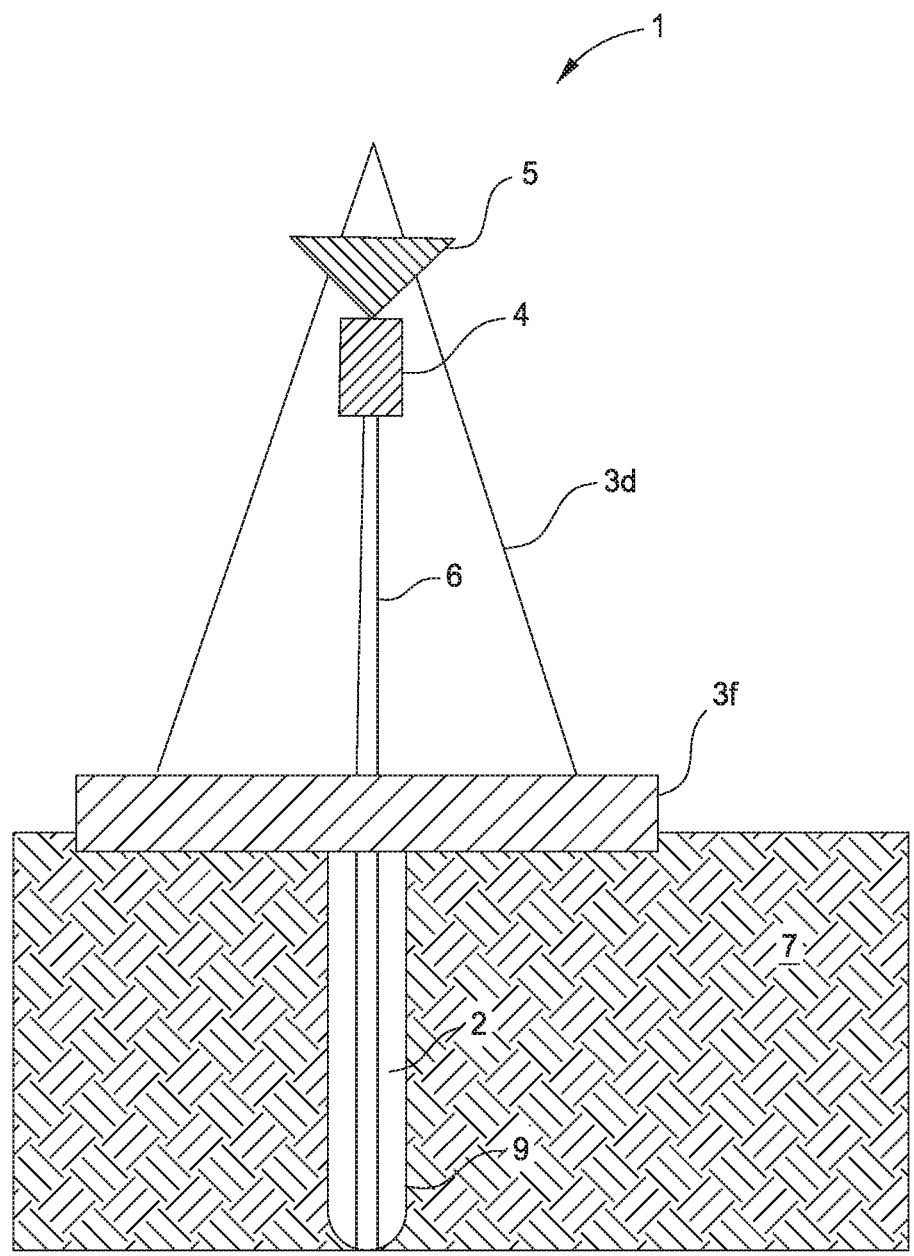
FIG. 1 illustrates a drilling system.

FIG. 1 illustrates a drilling system 1, according to embodiments of the present disclosure. The drilling system 1 may include a drilling rig derrick 3d on a drilling rig floor 3f. As illustrated, drilling rig floor 3f is at the surface of a subsurface formation 7, but the drilling system 1 may also be an offshore drilling unit, having a platform or subsea wellhead in place of or in addition to rig floor 3f. The derrick may support a hoist 5, thereby supporting a top drive 4. In some embodiments, the hoist 5 may be connected to the top drive 4 by threaded couplings. The top drive 4 may be connected to a tool string 2. At various times, top drive 4 may support the axial load of tool string 2. In some embodiments, the top drive 4 may be connected to the tool string 2 by threaded couplings. The rig floor 3f may have an opening through which the tool string 2 extends downwardly into a wellbore 9. At various times, rig floor 3f may support the axial load of tool string 2. During operation, top drive 4 may provide torque to tool string 2, for example to operate a drilling bit near the bottom of the wellbore 9. The tool string 2 may include joints of drill pipe connected together, such as by threaded couplings. At various times, top drive 4 may provide right hand (RH) torque or left hand (LH) torque to tool string 2, for example to make up or break out joints of drill pipe. Power and/or signals may be communicated between top drive 4 and tool string 2. For example, pneumatic, hydraulic, electrical, optical, or other power and/or signals may be communicated between top drive 4 and tool string 2. The top drive 4 may include a control unit, a drive unit, and a tool adapter. In some embodiments, the tool adapter may utilize threaded connections. In some embodiments, the tool adapter may be a combined multi-coupler (CMC) or quick connector to support load and transfer torque with couplings to transfer power (hydraulic, electric, data, and/or pneumatic).

A downhole tool coupling system 8 is configured to connect the tool string 2 to the top drive 4 via a drive stem 6. In this manner, the top drive 4 supports the axial load of the tool string 2. The drive stem 6 may directly connect to the top drive 4, for example, by threading into a quill of the top drive. Alternatively, the drive stem 6 may indirectly connect to the top drive 4, for example, by connecting to an adaptor that directly connects to the quill of the top drive. The downhole tool coupling system 8, discussed in more detail below, provides for safer, faster, more reliable, and more efficient connections that are capable of conveying load, data, signals, power and/or bi-directional torque between the tool string and the top drive are needed.

Figure 2A:
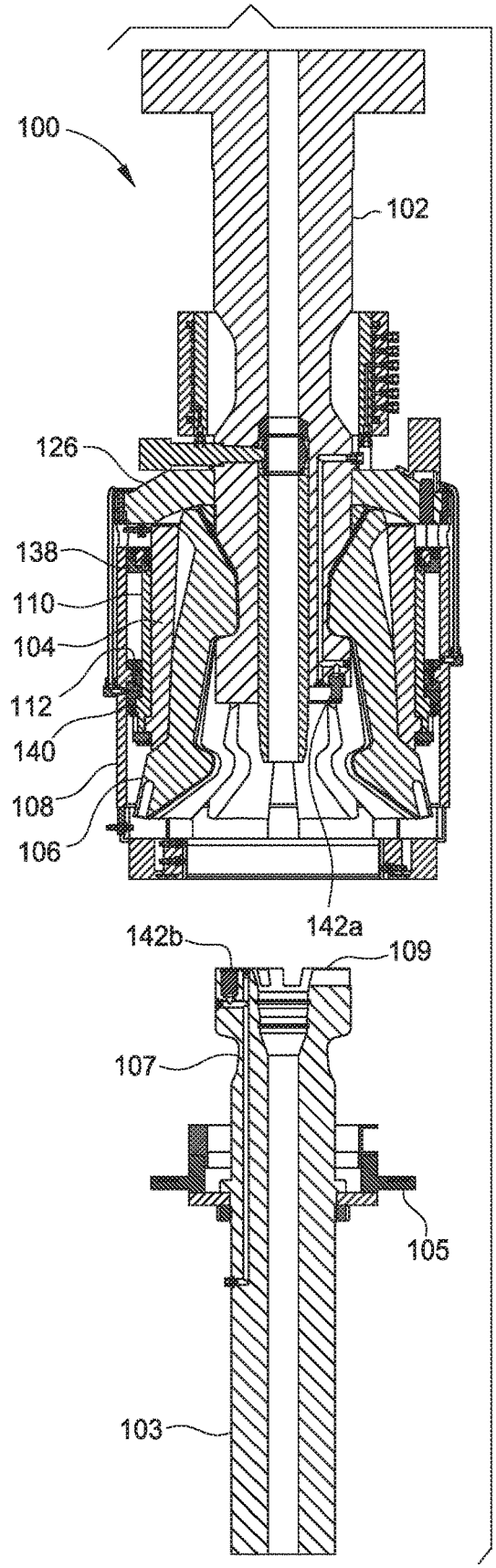
FIGS. 2A and 2B illustrate cross-sectional views of a downhole tool coupling system in a decoupled position, according to a first embodiment.

In one embodiment of the present disclosure shown in FIGS. 2A-9B, a downhole tool coupling system 100 may include a drive stem 102, a sleeve 104 longitudinally movable relative to the drive stem 102, a plurality of locking clamps 106, an exterior housing 108, and an actuator 110. As shown in FIG. 2A, the locking clamps 106 may be partially encompassed by the sleeve 104. The locking clamps 106 may be rotatable and radially movable between an open position (shown in FIGS. 2A and 2B) and a locked position (shown in FIGS. 9A and 9B). The sleeve 104 may be oriented relative to the locking clamps 106 to rotate the locking clamps from the open position to the locked position as the sleeve moves longitudinally from an upper or first position shown in FIG. 2A to a lower or second position shown in FIG. 9A. The exterior housing 108 may encompass the sleeve 104, the actuator 110, and the locking clamps 106. The exterior housing 108 may include a protrusion 112.

Each locking clamp 106 may be substantially similar in shape. In total, the downhole tool coupling system 100 may include ten locking clamps. It is to be understood, however, that the downhole tool coupling system 100 may include more or less locking clamps than ten. As best seen in FIG.

3, each locking clamp 106 includes a recessed interior region 114 configured to clamp the drive stem 102 to a tool stem 103 when in the locked position. Each locking clamp 106 may include a lower exterior shoulder surface 116 and an upper exterior shoulder surface 118. Each locking clamp 106 may further include an upper exterior surface 120a located between the lower and upper exterior shoulder surfaces 116, 118 and a lower exterior surface 120b located below the lower exterior shoulder surface 116. The exterior surfaces 120a,b of each locking clamp 106 may have a generally convex shape. The recessed interior region 114 may include an upper edge 122 and a lower edge 124.

Figure 4A:
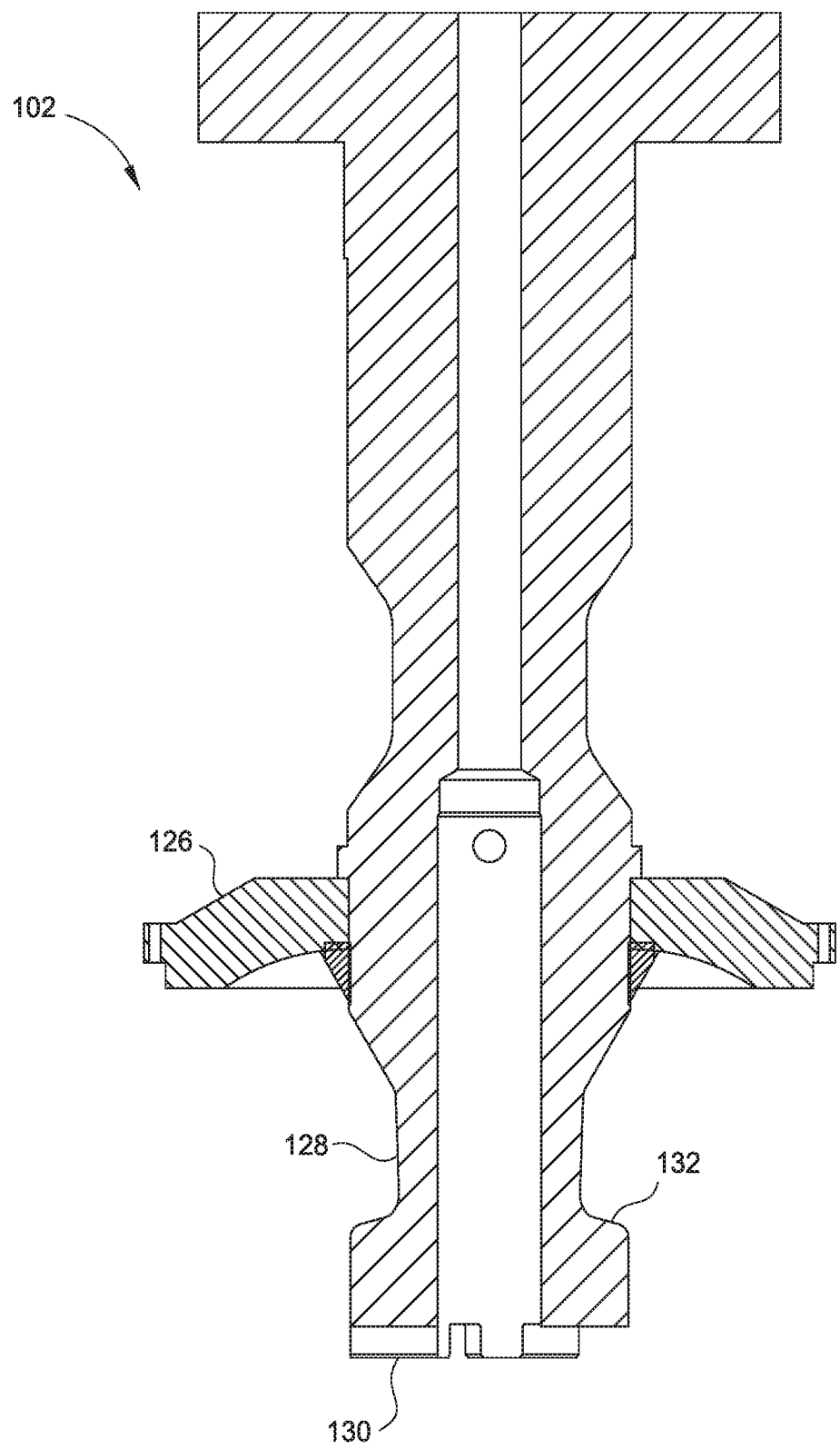
FIGS. 4A and 4B illustrate a drive stem of the downhole tool system, according to one embodiment.
Figure 4B:
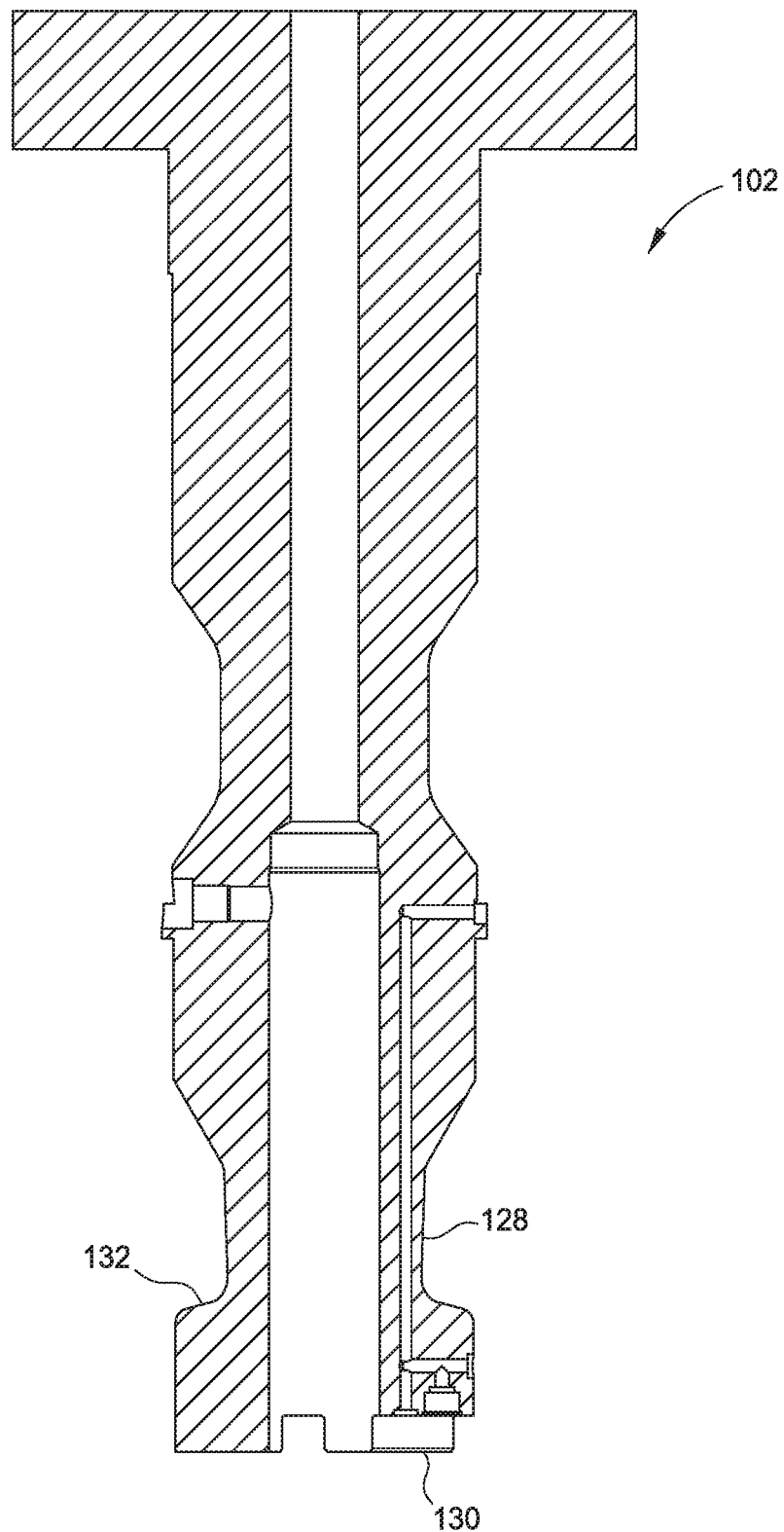

As best seen in FIGS. 4A and 4B, the drive stem 102 may include an upper boss 126, a notched region 128, and a plurality of shoulders 130. The upper boss 126 may be connected to the exterior housing 108 via one or more connectors (e.g., bolts, nut rings, or screws). The notched region 128 may include a lower ridge 132. The profile of the notched region 128 may be configured to enable the locking clamps 106 to rotate and radially move between the open and locked position. As seen in FIG. 2A, when in the open position, an upper face 134 of the locking clamps 106 may be substantially engaged with drive stem 102 within the notched region 128. Conversely, when in the closed position shown in FIGS. 9A and 9B, the upper face 134 of the locking clamps 106 may be spaced from the notched region 132 of the drive stem 102 except for engagement between the upper edge 122 of the locking clamps and the ridge 132. The plurality of shoulders 130 of the drive stem 102 may be located at a bottom end of the drive stem 102. The plurality of shoulders 130 may be configured to transfer torque to a tool stem 103, as discussed in more detail below.

The sleeve 104 may be longitudinally movable relative to the drive stem 102 and the exterior housing 108. As best seen in FIG. 5, a top end 134 of the sleeve 104 may have a greater cross-sectional thickness than a bottom end 136 of the sleeve. The top end 134 may have a smaller inner diameter than an inner diameter of the bottom end 136. Except for an exterior protrusion 137 for connecting the sleeve 104 to the actuator 110, the cross-sectional thickness of the sleeve 104 may uniformly decrease from the top end 134 to the bottom end 136. As a result, the inner diameter of the sleeve 104 may uniformly increase from the top end 134 to the bottom end 136. In this manner, the sleeve 104 may have a tapering cross-sectional thickness resulting in a tapered inner contour. Because of the tapering cross-sectional thickness of the sleeve 104 and the generally convex shape of the exterior surfaces 120a,b of each locking clamp 106, the sleeve 104 may engage the lower exterior shoulder surface 116 and rotate each locking clamp 106 from the open position towards the locked position as the sleeve 104 moves longitudinally from the first or upper position to the second or lower position. Similarly, the sleeve 104 may engage the upper exterior shoulder surface 118 and rotate and radially move each locking clamp 106 from the locked position towards the open position as the sleeve 104 moves longitudinally from the second or lower position to the first or upper position. A person of ordinary skill in the art will understand that the sleeve 104 may be connected to the actuator 110 by a connection other than the exterior protrusion 137.

As seen in FIGS. 2A, 6A, and 8A, the actuator 110 may be coupled to the sleeve 104 and configured to adjust the sleeve between the first or upper and second or lower positions. The actuator 110 may be powered electrically, hydraulically, or pneumatically. The actuator 110 may include an upper stop 138 and a lower stop 140. The protrusion 112 of the exterior housing 108 may be positioned between the upper and lower stops 138, 140 of the actuator 110. As seen in FIG. 2A, when the sleeve 104 is in the upper position, the protrusion 112 of the exterior housing 110 may be adjacent the lower stop 140. Conversely, as seen in FIG. 9A, when the sleeve 104 is in the lower position, the protrusion 112 of the exterior housing 110 may be adjacent the upper stop 138.

As seen in FIG. 2A, when the sleeve 104 is in the first or upper position, the upper edge 122 of each locking clamp 106 is engaged with the ridge 132 of the drive stem 102. The locking clamps 106 are in the open position, enabling the receipt of the tool stem 103 within the downhole tool coupling system 100. As seen in FIG. 2A, the tool stem 103 may include a lower boss 105, a notched region 107, and a plurality of shoulders 109. The notched region 107 of the tool stem 103 may include a ridge 111. The plurality of shoulders 109 of the tool stem 103 may be located at a top end of the tool stem. The plurality of shoulders 109 of the tool stem 103 may be configured to mate with the plurality of shoulders 130 of the drive stem 102.

While the locking clamps 106 are in the open position, the bottom surface of the shoulders 130 of the drive stem 102 are brought into engagement with the top surface of the shoulders 109 of the tool stem 103, as seen in FIGS. 6A and 6B. If necessary, the drive stem 102 may be rotated to ensure that the shoulders 130 of the drive stem become properly aligned and engaged with the shoulders of the tool stem 103, as seen in FIGS. 7A and 7B. The actuator 110 may be actuated to adjust the sleeve 104 from the upper position towards the lower position, as seen in FIGS. 8A and 8B. As the sleeve 104 adjusts from the first or upper position towards the second or lower position, a lower portion the sleeve 104 engages the lower exterior shoulder surface 116 to thereby cause the locking clamps 106 to rotate from the open position to an intermediate position, shown in FIGS. 8A and 8B. More specifically, as the sleeve 104 adjusts from the upper position towards the lower position, the upper edge 122 of each locking clamp 106 pivots about the ridge 132 of the drive stem 102 until the locking clamps 106 are substantially parallel to the drive stem 102.

After the locking clamps 106 are rotated to the intermediate position, further downward movement of the sleeve 104 to the second or lower position moves the locking clamps 106 radially inward because of the tapered inner contour of the sleeve 104 to the locked position, as can be seen in FIGS. 9A and 9B. More specifically, as the sleeve 104 adjusts from the first or upper position towards the second or lower position, each locking clamp 106 moves radially inward towards the drive stem 102 and the tool stem 103 until the lower edge 124 of each locking clamp engages the ridge 111 of the tool stem 103. The contact surface of the ridge 132 of the drive stem 102 and the contact surface of the ridge 111 of the tool stem 103 are tapered such that radial movement of the locking clamps 106 applies a preload force clamping the tool stem 103 and the drive stem 102 together. The applied preload force eliminates the tolerances and wear of the connection between the tool stem 103 and the drive stem 102 and reduces vibrations during operation of the tool. After the shoulders 130 of the drive stem 102 engage the shoulders 109 of the tool stem 103 and the tool stem 103 and the drive stem 102 are clamped together, a torque transfer path is established enabling full bi-directional torque to be applied to the tool string via the drive stem 102.

Figure 2B:
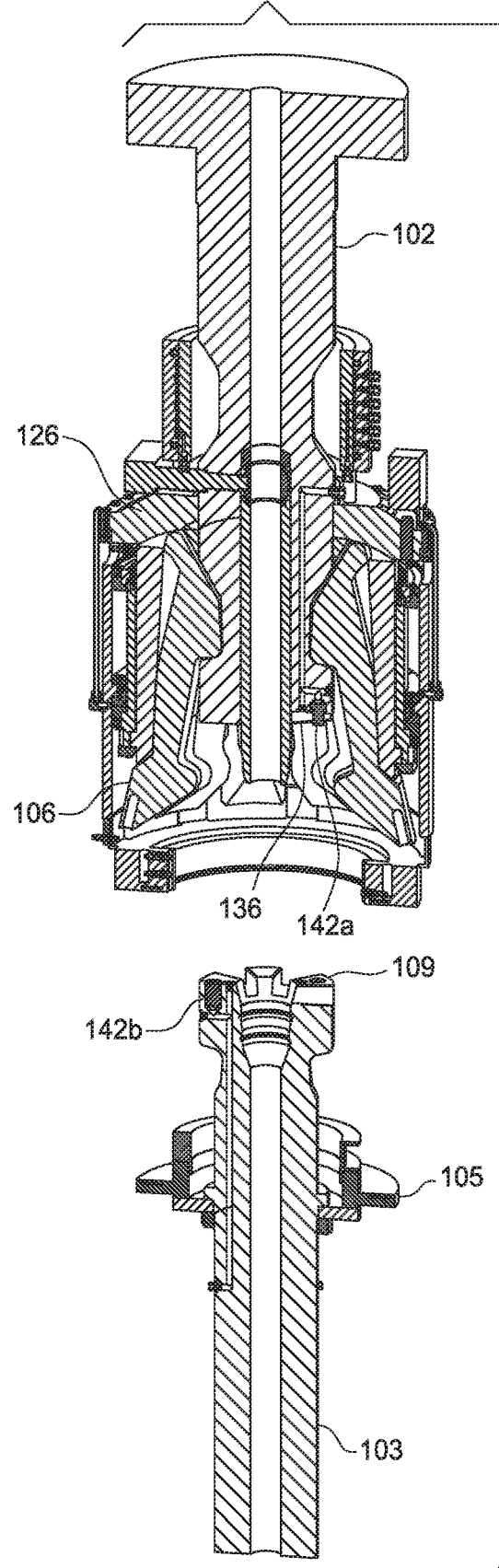

As best seen in FIGS. 2A and 2B, the downhole tool coupling system 100 may further include at least one coupling 142 for communicating signals from the top drive 4 to the tool string 2. For example, the coupling 142 may provide fluid, electrical, optical, signal, data, and/or power communication between the top drive 4 and the tool string 2. The coupling 142 may include a male coupler 142*a* and a female coupler 142*b*. The male coupler 142*a* may be located on one of the shoulders 130 of the drive stem 102 and the female coupler 142*b* may be located on one of the shoulders 109 of the tool stem 103. When the drive stem 102 and the tool stem 103 first engage each other, as shown in FIGS. 6A and 6B, the male and female couplers 142*a*, 142*b* may not properly align. However, upon rotation of the drive stem 102 and matching of the shoulders 130 of the drive stem with the shoulders 109 of the tool stem, the male coupler 142*a* may be received within the female coupler 142*b*, thereby establishing a communication link between the drive stem and the tool stem. In an alternative embodiment of the coupling not shown, the male coupler may be connected to the sleeve and the female coupler may be connected to the lower boss of the tool stem. When the sleeve is lowered from the first or upper position to the second or lower position, the male coupler is received within the female coupler. It is to be understood that the placement of the male coupler and female coupler could be swapped.

To unclamp and release the tool stem 103 from the drive stem 102, the actuator 110 can be actuated to adjust the sleeve 104 from the second or lower position to the first or upper position. As the sleeve 104 adjusts from the second or lower position towards the first or upper position, the preload force is eliminated and the locking clamps 106 move radially outward. As the sleeve 104 continues to move upward, an upper portion of the sleeve engages the upper exterior shoulder surface 118 to thereby cause the locking clamps 106 to rotate to the open position. More specifically, as the sleeve 104 adjusts from the second or lower position to the first or upper position, the upper edge 132 of each locking clamp 106 pivots about the ridge 132 of the drive stem 102 until being located in the open position, as can be seen in FIGS. 2A and 2B. In this configuration, the locking clamps 106 are no longer parallel to the drive stem 102. As the locking clamps 106 pivot about the ridge 132 of the drive stem 102, the lower edge 124 of the locking clamps disengage from the ridge 111 of the tool stem 103 such that the tool stem 203 is no longer connected to the drive stem 202 via the locking clamps 206.

After the drive stem 102 is disconnected from the tool stem 103, the drive stem 102 can be moved away from the tool stem 103 such that the shoulders 130 of the drive stem 102 are no longer adjacent the shoulders 109 of the tool stem 103, as seen in FIGS. 2A and 2B. In order to service or provide maintenance, the downhole tool coupling system 100 may then be further disassembled to remove the locking clamps 106 from the sleeve 104 and the exterior housing 108 by lifting the drive stem 102 (and thus the locking clamps 106) upward. The locking clamps 106 will be lifted upwardly with the drive stem 102 because the upper edge 122 of the locking clamps 106 are engaged with the ridge 132 of the drive stem 102. A securing element (e.g., a belt) may be used to secure the various locking clamps 106 to each other. As the locking clamps 106 move upward relative to the sleeve 104, the tapered surface of the sleeve 104 forces the locking clamps 106 to rotate to a position that enables them to be removed from the sleeve 104 and the exterior housing 110.

Figure 11A:
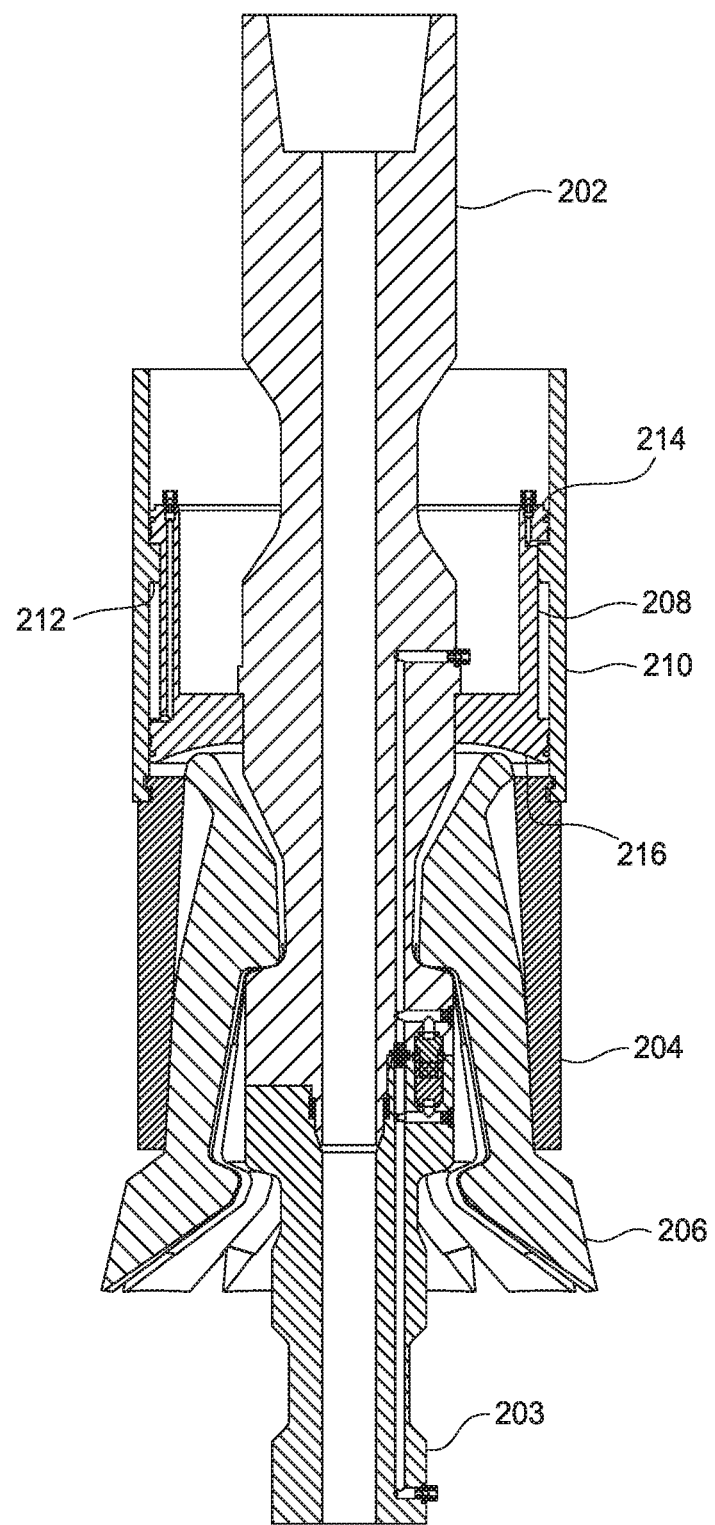
FIG. 11A illustrates a cross-sectional view of a downhole tool system in an unlocked position, according to a second embodiment.
Figure 11B:
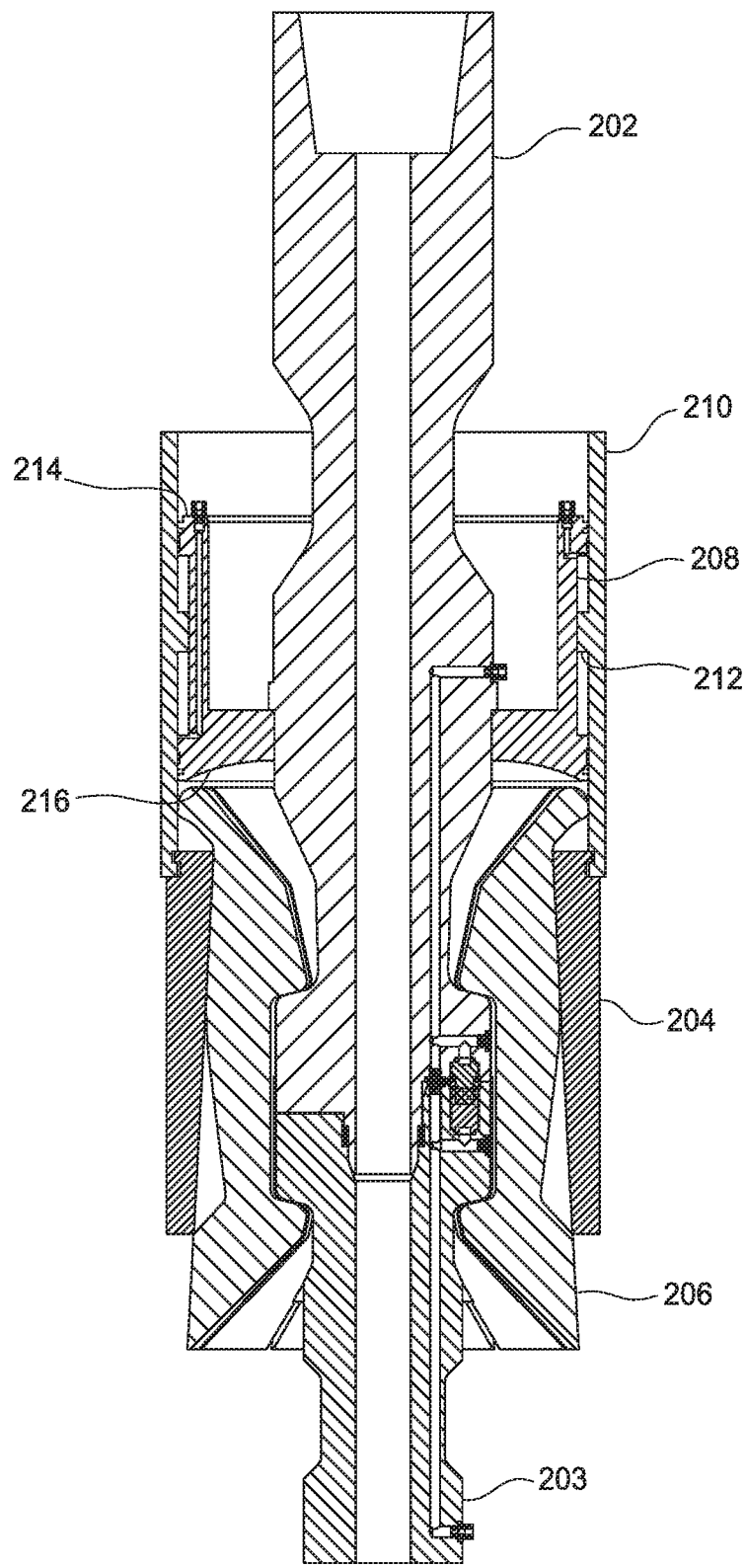
FIG. 11B illustrates a cross-sectional view of a downhole tool system in an intermediate position, according to a second embodiment.
Figure 12:
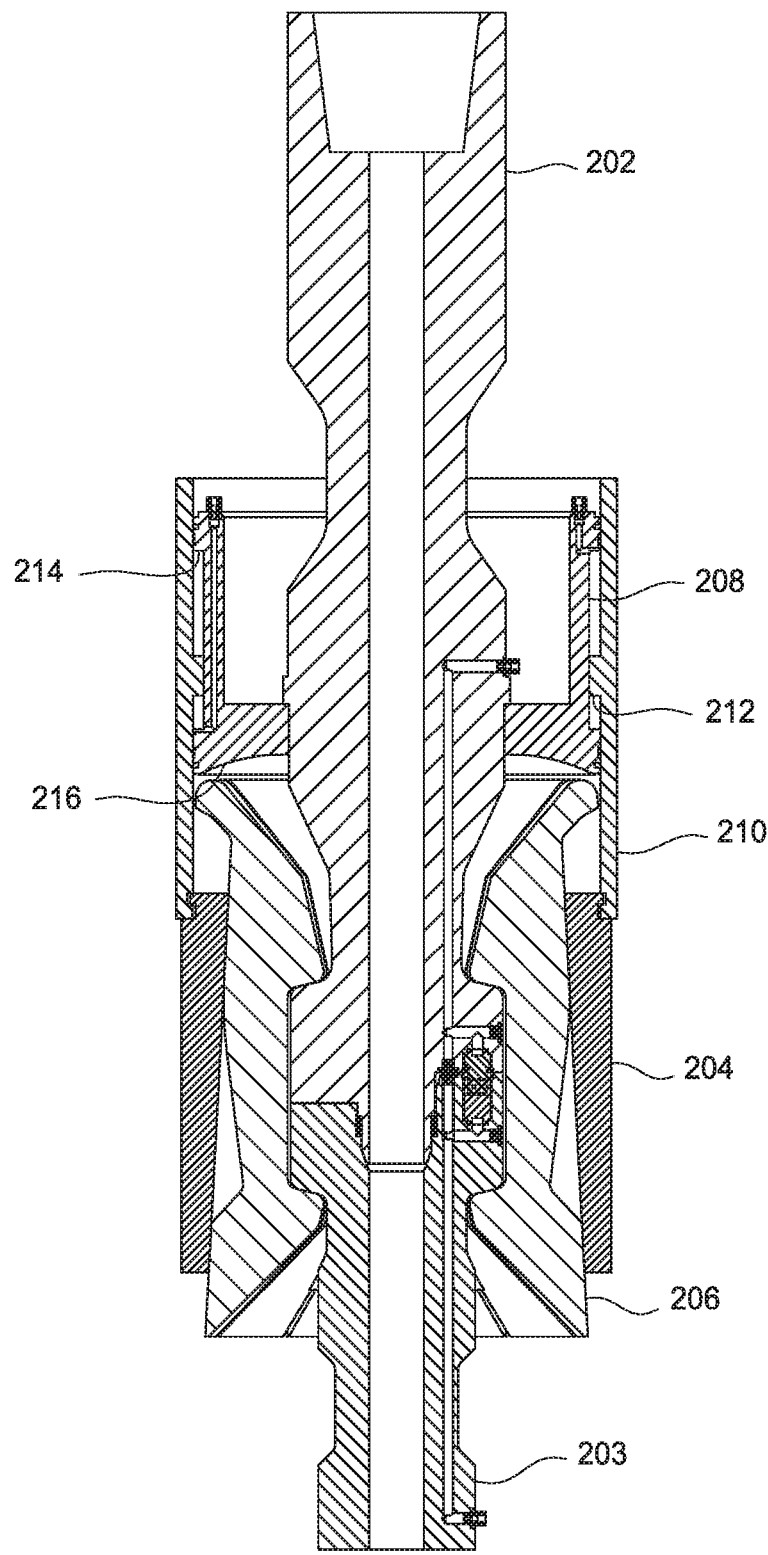
FIG. 12 illustrates a cross-sectional view of a downhole tool system in a locked position, according to a second embodiment.

Another embodiment of the present disclosure is shown in FIGS. 10-12. In this embodiment, a downhole tool coupling system 200 may include a drive stem 202, a sleeve 204, a plurality of locking clamps 206, an actuator 208, and an actuator adapter 210. The drive stem 202, the sleeve 204, and the locking clamps 206 are substantially similar to the drive stem 102, sleeve 104, and locking clamps 106 discussed above for the downhole tool coupling system 100 shown in FIGS. 2-9B, with the exception that the drive stem 202 does not include an upper boss. As such, the drive stem 202, the sleeve 204, and locking clamps 206 operate in a similar manner as the operation described above to connect the drive stem to a tool stem 203.

However, unlike the embodiment shown in FIGS. 2-9B, the downhole tool coupling system 200 does not include an exterior housing surrounding the sleeve 204, the locking clamps 206, and the actuator 208. Instead, a lower end of the actuator 208 is rigidly connected to an upper end of the sleeve 204. Because of this orientation, the outer diameter of the actuator 208 for the downhole tool coupling system 200 is reduced as compared to the outer diameter of the actuator 108 for the downhole tool coupling system 100.

The actuator 208 includes a protrusion 212 located between an upper stop 214 and a lower stop 216 of the actuator adapter 210. The actuator adapter 210 is rigidly connected to the tool stem 202 such that the lower stop 216 is located above a notched region of the tool stem 202. The actuator 208 may be powered electrically, hydraulically, or pneumatically. As seen in FIG. 10, when the protrusion 212 of the actuator 208 is adjacent the upper stop 214 of the actuator adapter 210, the sleeve 204 is in the first or upper position. As seen in FIG. 12, when the protrusion 212 of the actuator 208 is adjacent the lower stop 216 of the actuator adapter 210, the sleeve is in the second or lower position.

As seen in FIG. 11A, when the sleeve 204 is in the first or upper position, an upper edge of each locking clamp 206 is engaged with a ridge of the drive stem 202. The locking clamps 206 are in the open position, enabling the receipt of the tool stem 203 within the downhole tool coupling system 200.

While the locking clamps 206 are in the open position, a bottom surface of shoulders of the drive stem 202 are brought into engagement with the top surface of shoulders of the tool stem 203, as seen in FIG. 11A. If necessary, the drive stem 202 may be rotated to ensure that the shoulders of the drive stem 202 become properly aligned and engaged with the shoulders of the tool stem 203, as seen in FIG. 11A. The actuator 210 may be actuated to adjust the sleeve 204 from the first or upper position towards the second or lower position, as seen in FIGS. 11A, 11B and 12. As the sleeve 204 adjusts from the first or upper position towards the second or lower position, a lower portion the sleeve 204 engages a lower exterior shoulder surface of the locking clamps 206 to thereby cause the locking clamps 206 to rotate from the open position to an intermediate position, shown in FIG. 11B. More specifically, as the sleeve 204 adjusts from the upper position towards the lower position, the upper edge of each locking clamp 206 pivots about the ridge of the drive stem 202 until the locking clamps 206 are substantially parallel to the drive stem 202.

After the locking clamps 206 are rotated to the intermediate position, further downward movement of the sleeve 204 to the second or lower position moves the locking clamps 206 radially inward because of the tapered inner contour of the sleeve 204 to the locked position, as can be seen in FIG. 12. More specifically, as the sleeve 204 adjusts from the first or upper position towards the second or lower position, each locking clamp 206 moves radially inward towards the drive stem 202 and the tool stem 203 until a lower edge of each locking clamp 206 engages a ridge of the tool stem 203. The contact surface of the ridge of the drive stem 202 and the contact surface of the ridge of the tool stem 203 are tapered such that radial movement of the locking clamps 206 applies a preload force clamping the tool stem 203 and the drive stem 202 together. The applied preload force eliminates the tolerances and wear of the connection between the tool stem 203 and the drive stem 202 and reduces vibrations during operation of the tool. After the shoulders of the drive stem 202 engage the shoulders of the tool stem 203 and the tool stem 203 and the drive stem 202 are clamped together, a torque transfer path is established enabling full bi-directional torque to be applied to the tool string via the drive stem 202.

To unclamp and release the tool stem 203 from the drive stem 202, the actuator 210 can be actuated to adjust the sleeve 204 from the second or lower position to the first or upper position. As the sleeve 204 adjusts from the second or lower position towards the first or upper position, the preload force is eliminated and the locking clamps 206 move radially outward. As the sleeve 204 continues to move upward, an upper portion of the sleeve engages an upper exterior shoulder surface of the locking clamps 206 to thereby cause the locking clamps 206 to rotate to the open position. More specifically, as the sleeve 204 adjusts from the second or lower position to the first or upper position, the upper edge of each locking clamp 206 pivots about the ridge of the drive stem 202 until being located in the open position, as can be seen in FIG. 11A. In this configuration, the locking clamps 206 are no longer parallel to the drive stem 202. As the locking clamps 206 pivot about the ridge of the drive stem 202, the lower edge of the locking clamps disengage from the ridge of the tool stem 203 such that the tool stem 203 is no longer connected to the drive stem 202 via the locking clamps 206.

After the drive stem 202 is disconnected from the tool stem 203, the drive stem 202 can be moved away from the tool stem 203 such that the shoulders of the drive stem 202 are no longer adjacent the shoulders of the tool stem 203, as seen in FIG. 10.

A third embodiment of the present disclosure is shown in FIGS. 13A-18B. A downhole tool coupling system 300 may include a drive stem 302, a sleeve 304, a plurality of locking clamps 306, an actuator 308, an actuator adapter 310, and a locking clamp connector 312. The actuator 308 and the actuator adapter 310 may be substantially similar to the actuator 208 and the actuator adapter 210 discussed above with regard to the second embodiment shown in FIGS. 10-12. As such, the actuator 308 and the actuator adapter 312 operate in a similar manner as the operation described above.

Figure 14:
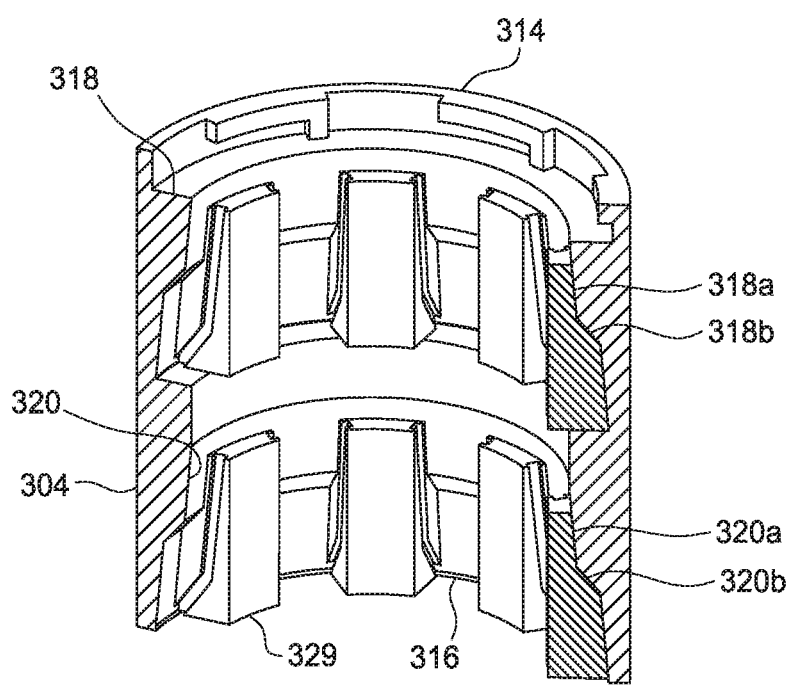
FIG. 14 illustrates a sleeve of a downhole tool system, according to a third embodiment.

Unlike the previously described embodiments, as seen in FIG. 14, the cross-sectional thickness of the sleeve 304 does not decrease uniformly from an upper end 314 of the sleeve to a bottom end 316. Instead, the sleeve 304 may include an upper protrusion 318 and a lower protrusion 320. More specifically, the upper protrusion 318 may have a first tapered portion 318a and a second tapered portion 318b. The lower protrusion 320 may also have a first tapered portion 320a and a second tapered portion 320b. The first tapered portion 318a of the upper protrusion 318 is substantially similar in shape to the first tapered portion 320a of the lower protrusion 320. Similarly, the second tapered portion 318b of the upper protrusion 318 is substantially similar in shape to the second tapered portion 320b of the lower protrusion 320. The first tapered portion of the upper and lower protrusions 318a, 320a may have a greater gradient than the second tapered portion of the upper and lower protrusions 318b, 320b.

Figure 15:
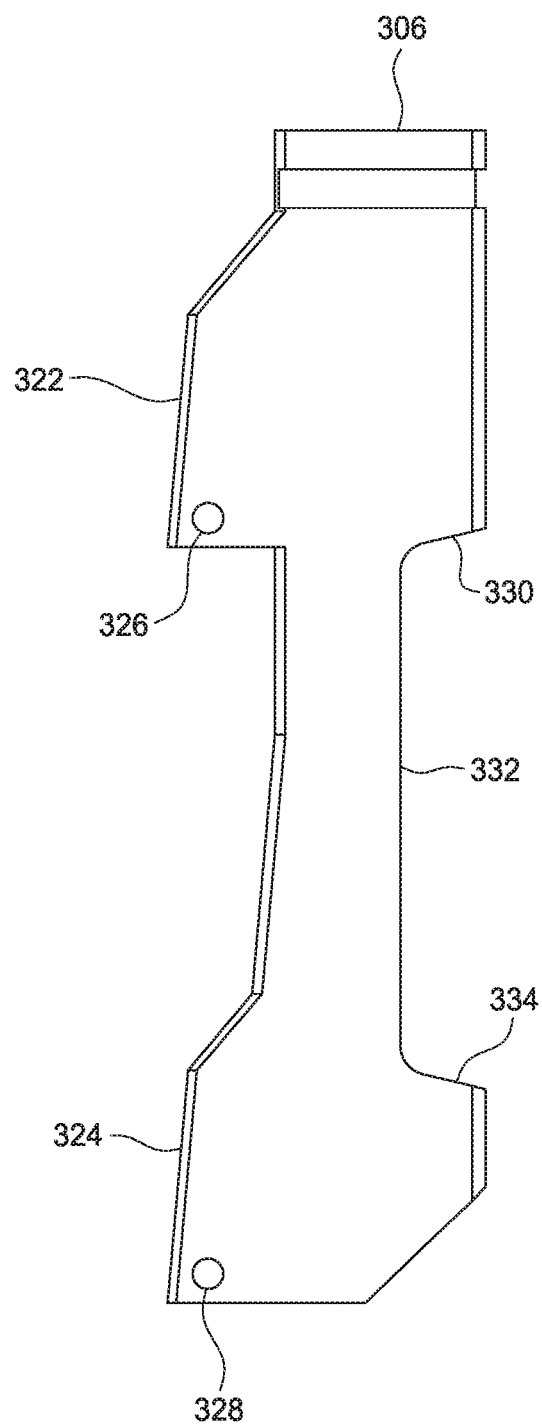
FIG. 15 illustrates a locking clamp of a downhole tool system, according to a third embodiment.

As seen in FIG. 15, the locking clamps 306 may have an upper shoulder exterior surface 322 and a lower shoulder exterior surface 324. The profile of the upper shoulder exterior surface 322 may mirror the profile of the upper protrusion 318 of the sleeve 304. Similarly, the profile of the lower shoulder exterior surface 324 of each locking clamp 306 may mirror the profile of the lower protrusion 320 of the sleeve 304. Unlike the locking clamps 106 and 206, the locking clamps 306 remain substantially parallel to the drive stem 302 when in the open position (shown in FIG. 16A) and when in the closed position (shown in FIG. 18A). Each locking clamp 306 may further include a pair of upper protrusions 326 protruding outwardly from the sidewalls of each locking clamp at the upper shoulder exterior surface 322 and a pair of lower protrusions 328 protruding outwardly from the sidewalls of each locking clamp at lower shoulder exterior surface 324.

As best seen in FIG. 14, the downhole tool coupling system 300 may further include a plurality of retainers 329 attached to an internal surface of the sleeve 304. Each retainer 329 may be located between two of the locking clamps 306 and include a pair of upper slots and a pair of lower slots. The pair of upper slots may be configured to receive the upper protrusions 326 of adjacent locking clamps and the pair of lower slots may be configured to receive the lower protrusions 328. As seen in FIG. 15, each upper and lower slot may include a first sloped portion and a second sloped portion, with the first sloped portion having a lesser gradient than the second sloped portion. The upper and lower slots may be substantially similar in shape.

In the embodiment shown in FIGS. 13A-18B, the locking clamps 306 may move radially between an open position and a locked position. When in the open position, the locking clamps 306 define a first bore diameter capable of receiving a tool stem 303, as can be seen in FIGS. 16A and 16B. When in the locked position, the locking clamps 306 move radially inward to define a second bore diameter less than the first bore diameter, as seen in FIGS. 18A and 18B.

The clamp connector 312 connects each of the plurality of locking clamps 306 to each other. The clamp connector 312 may include a groove for receiving an upper end of each locking clamp 316. The upper end of each locking clamp may be keyed to slide radially inward and outward within a corresponding groove of the clamp connector 312. As such, the clamp connector 312 may function as a guide as the locking clamps adjust radially from the open position (FIG. 16A) to the locked position (FIG. 18A).

Figure 17A:
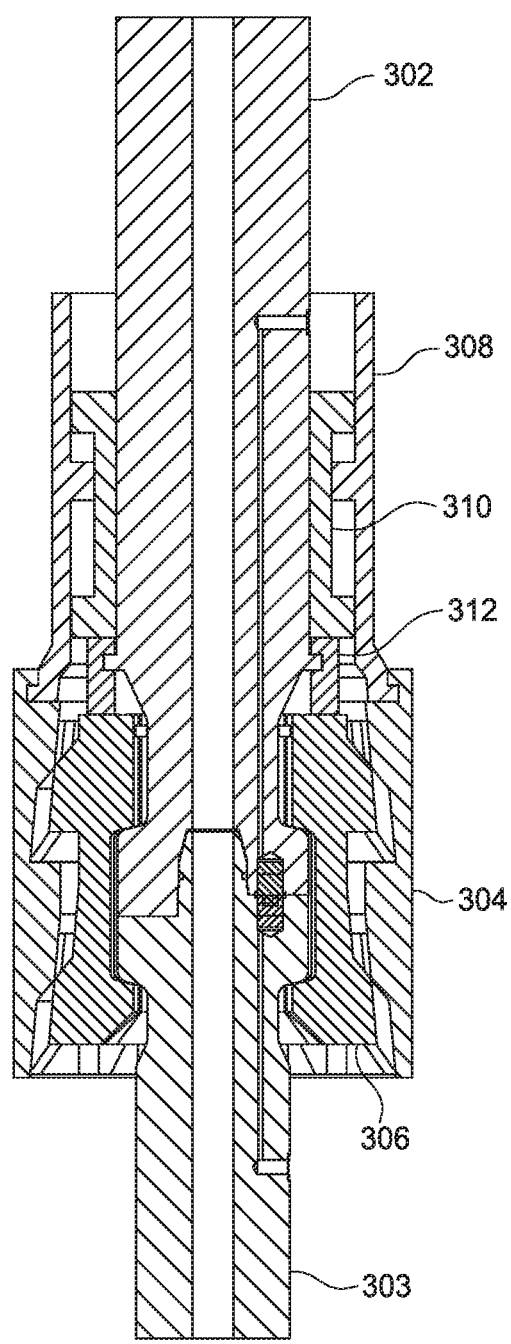
FIGS. 17A and 17B illustrate a downhole tool system in an intermediate position, according to a third embodiment.
Figure 17B:
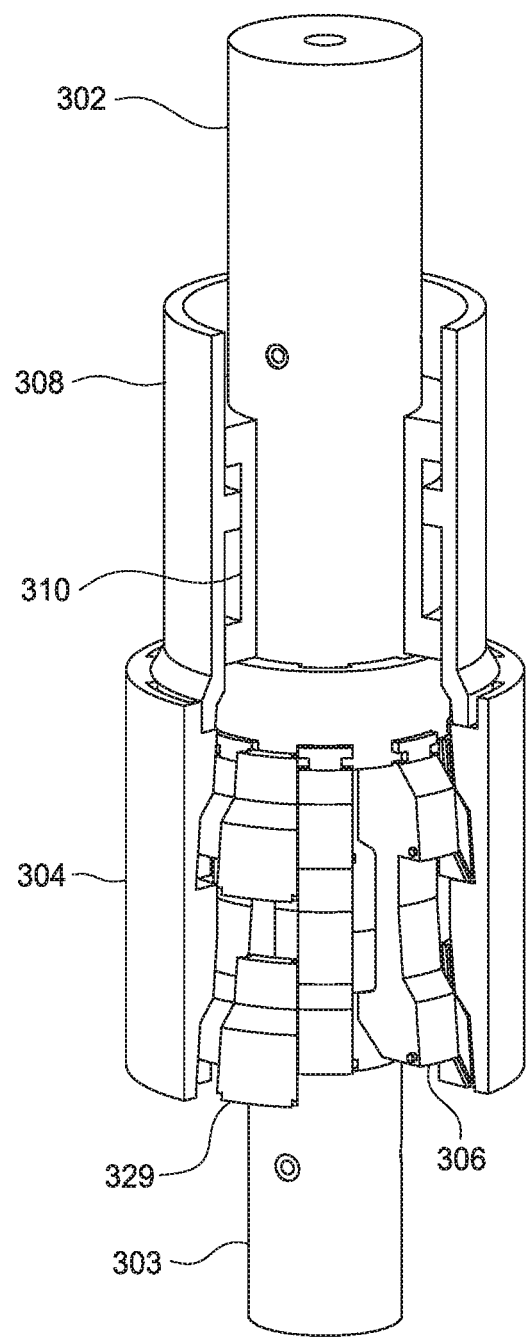

As seen in FIGS. 16A and 16B, when the sleeve 304 is in the first or upper position, the locking clamps 306 are in the open position. Upon actuation of the actuator 308, the sleeve 304 is moved downwardly from the first or upper position towards an intermediate position, as seen in FIGS. 17A and 17B. As the sleeve 304 moves from the first or upper position towards the intermediate position and second or lower position, the upper protrusion 318 engages the profile of the upper exterior shoulder surface 322 and the lower protrusion 320 engages the profile of the lower exterior shoulder surface 324. As the first tapered portion of the upper and lower protrusions 318a, 320a of the sleeve 304 engage each locking clamp 306, the locking clamps will be moved radially inward such that an upper edge 330 of a recessed region 332 of each locking clamp 306 contacts a ridge of the drive stem 302 and a lower edge 334 of the recessed region 332 of each locking clamp 306 contacts a ridge of the tool stem 303 to connect the drive and tool stems 302, 303. When in the intermediate position, the locking clamps 306 define a third bore diameter between the first bore diameter and the second bore diameter, as seen in FIGS. 17A and 17B. The sleeve 304 continues moving downward from the intermediate position to the second or lower position, as seen in FIGS. 18A and 18B. As the second tapered portion of the upper and lower protrusions 318b, 320b of the sleeve 304 engage each locking clamp 306, a preloading force will be applied, thereby clamping the drive 302 and tool stems 303 together because of the tapered contact surface between locking clamps 306 and the ridges. The applied preload force eliminates the tolerances and wear of the connection between the tool stem 303 and the drive stem 302 and reduces vibrations during operation of the tool. While the sleeve 304 is moving from the first or upper position to the second or lower position, the upper and lower protrusions 326, 328 of each locking clamp will also move within the corresponding upper and lower slots of each retainer 329.

To release the preloading force clamping the drive and tool stems together, the actuator 310 may be actuated to move the sleeve 304 from the second or lower position to the first or upper position. Because of the upper and lower protrusions 326, 328 of each locking clamp 306 within the corresponding upper and lower slots of each retainer 329, the clamping members will move radially outward from the locked position towards the open position when the sleeve 304 moves from the second or lower position to the first or upper position.

In one or more of the embodiments described herein, a downhole tool coupling system includes a drive stem, a sleeve, and a plurality of locking clamps.

In one or more of the embodiments described herein, the sleeve is longitudinally movable relative to the drive stem.

In one or more of the embodiments described herein, the locking clamps are at least partially encompassed by the sleeve.

In one or more of the embodiments described herein, the locking clamps are rotatable between an open position and a locked position.

In one or more of the embodiments described herein, the sleeve is oriented relative to the locking clamps to rotate and radially move the locking clamps from the open position to the locked position as the sleeve moves longitudinally from a first position to a second position.

In one or more of the embodiments described herein, the locking clamps have an interior recessed region configured to clamp the drive stem to a tool stem when in the locked position.

In one or more of the embodiments described herein, the locking clamps are radially movable between an open position and a locked position.

In one or more of the embodiments described herein, the sleeve is oriented relative to the locking clamps to radially move the locking clamps from the open position to the locked position as the sleeve moves longitudinally from a first position to a second position.

In one or more of the embodiments described herein, the locking clamps are substantially similar in shape.

In one or more of the embodiments described herein, a bottom end of the drive stem comprises a plurality of shoulders configured to transfer torque to a tool stem.

In one or more of the embodiments described herein, the downhole tool includes an exterior housing.

In one or more of the embodiments described herein, the sleeve and the locking clamps are disposed within the exterior housing.

In one or more of the embodiments described herein, each locking clamp includes a lower exterior shoulder surface.

In one or more of the embodiments described herein, the sleeve is configured to engage the lower exterior shoulder surface and rotate and radially move each locking clamp from the open position to the locked position as the sleeve moves longitudinally from the upper position to the lower position.

In one or more of the embodiments described herein, each locking clamp includes an upper exterior shoulder surface.

In one or more of the embodiments described herein, the sleeve is configured to engage the upper exterior shoulder surface and rotate and radially move each locking clamp from the locked position to the open position as the sleeve moves longitudinally from the lower position to the upper position.

In one or more of the embodiments described herein, a top end of the sleeve has an inner diameter smaller than an inner diameter of a bottom end of the sleeve.

In one or more of the embodiments described herein, each locking clamp has an exterior surface located between the upper and lower exterior shoulder surfaces.

In one or more of the embodiments described herein, the exterior surface of each locking clamp has a generally convex shape.

In one or more of the embodiments described herein, the downhole tool includes an actuator configured to move the sleeve from the first position to the second position.

In one or more of the embodiments described herein, the sleeve the actuator and the locking clamps are disposed within the exterior housing.

In one or more of the embodiments described herein, the actuator has an upper stop and a lower stop and the exterior housing has a protrusion located between the upper and lower stops of the actuator.

In one or more of the embodiments described herein, the interior recessed recessed region of each locking clamp includes an upper edge and a lower edge.

In one or more of the embodiments described herein, the upper edge of each interior recessed region engages a ridge of the drive stem.

In one or more of the embodiments described herein, the interior recessed region of each locking clamp is configured to enable each locking clamp to rotate about the ridge of the drive stem when rotating and radially moving from the open position to the locked position.

In one or more of the embodiments described herein, the downhole tool includes a plurality of retainers attached to an internal surface of the sleeve.

In one or more of the embodiments described herein, each locking clamp includes a first protrusion extending from a first sidewall and a second protrusion extending from an opposing second sidewall.

In one or more of the embodiments described herein, each retainer is located between two of the plurality of locking clamps and includes at least one slot for receiving one of the protrusions of each of the adjacent locking clamps.

In one or more of the embodiments described herein, each locking clamp has a lower exterior shoulder.

In one or more of the embodiments described herein, the sleeve includes a lower protrusion configured to engage the lower exterior shoulder and radially move each locking clamp from the open position to the locked position as the sleeve moves longitudinally from the first position to the second position.

In one or more of the embodiments described herein, each locking clamp has clamp has an upper exterior shoulder.

In one or more of the embodiments described herein, the sleeve includes an upper protrusion configured to engage the upper exterior shoulder and radially move each locking clamp from the open position to the locked position as the sleeve moves longitudinally from the first position to the second position.

In one or more of the embodiments described herein, the lower exterior shoulder includes a first lower exterior shoulder surface and a second lower exterior shoulder surface.

In one or more of the embodiments described herein, the first and second lower exterior shoulder surfaces include a taper.

In one or more of the embodiments described herein, the taper of the first lower exterior shoulder surface is steeper than the taper of the second exterior shoulder surface.

In one or more of the embodiments described herein, the upper exterior shoulder includes a first upper exterior shoulder surface and a second upper exterior shoulder surface.

In one or more of the embodiments described herein, the first and second upper exterior shoulder surfaces include a taper.

In one or more of the embodiments described herein, the taper of the first upper exterior shoulder surface is steeper than the taper of the second upper exterior shoulder surface.

In one or more of the embodiments described herein, the lower protrusion of the sleeve has a surface profile mirroring a surface profile of the lower exterior shoulder and the upper protrusion of the sleeve has a surface profile mirroring a surface profile of the upper exterior shoulder.

In one or more of the embodiments described herein, the downhole tool includes an actuator adapter encompassing the drive stem.

In one or more of the embodiments described herein, the actuator adapter includes an upper stop and a lower stop.

In one or more of the embodiments described herein, an actuator has a protrusion located between the upper and lower stops of the actuator adapter.

In one or more of the embodiments described herein, a method for connecting a drive stem and a tool stem includes moving a sleeve longitudinally relative to the drive stem from a first position to a second position, moving a plurality of locking clamps radially between an open position and a locked position as the sleeve moves from the first position to the second position, the plurality of locking clamps at least partially encompassed by the sleeve, and engaging the tool stem with the plurality of locking clamps, thereby connecting the drive stem to the tool stem in the locked position.

In one or more of the embodiments described herein, a method for connecting a drive stem and a tool stem includes moving a sleeve longitudinally relative to the drive stem from a first position to a second position, rotating a plurality of locking clamps radially between an open position and a locked position as the sleeve moves from the first position to the second position, the plurality of locking clamps at least partially encompassed by the sleeve, and engaging the tool stem with the plurality of locking clamps, thereby connecting the drive stem to the tool stem in the locked position.

While the foregoing is directed to embodiments of the present invention, other and further embodiments of the invention may be devised without departing from the basic scope thereof, and the scope thereof is determined by the claims that follow.

The invention claimed is:

1. A downhole tool coupling system, comprising:
   a drive stem having shoulders on a bottom surface of the drive stem for transferring torque;
   a sleeve longitudinally movable relative to the drive stem; and
   a plurality of locking clamps at least partially encompassed by the sleeve, the locking clamps radially moveable between an open position and a locked position and having a lower exterior shoulder and an upper exterior shoulder, the sleeve oriented relative to the locking clamps to move both exterior shoulders of the locking clamps in a radial inward direction from the open position to the locked position as the sleeve moves longitudinally from a first position to a second position, each locking clamp having an interior recessed region configured to clamp the drive stem to a tool stem when in the locked position, wherein the tool stem includes shoulders configured to mate with the shoulders of the drive stem to transfer torque therebetween.

2. The downhole tool coupling system of claim 1, further comprising a plurality of retainers attached to an internal surface of the sleeve, wherein each locking clamp includes a first protrusion extending from a first sidewall and a second protrusion extending from an opposing second sidewall, each retainer located between two of the plurality of locking clamps and having at least one slot for receiving one of the protrusions of each of the adjacent locking clamps.

3. The downhole tool coupling system of claim 1, wherein the sleeve having a lower protrusion configured to engage the lower exterior shoulder and radially move each locking clamp from the open position to the locked position as the sleeve moves longitudinally from the first position to the second position.

4. The downhole tool coupling system of claim 3, wherein the sleeve having an upper protrusion configured to engage the upper exterior shoulder and radially move each locking clamp from the open position to the locked position as the sleeve moves longitudinally from the first position to the second position.

5. The downhole tool coupling system of claim 4, wherein the lower exterior shoulder has a first lower exterior shoulder surface and a second lower exterior shoulder surface, the first and second lower exterior shoulder surfaces having a taper, the taper of the first lower exterior shoulder surface being steeper than the taper of the second lower exterior shoulder surface.

6. The downhole tool coupling system of claim 5, wherein the upper exterior shoulder has a first upper exterior shoulder surface and a second upper exterior shoulder surface, the first and second upper exterior shoulder surfaces having a taper, the taper of the first upper exterior shoulder surface being steeper than the taper of the second upper exterior shoulder surface.

7. The downhole tool coupling system of claim 6, wherein the lower protrusion of the sleeve has a surface profile mirroring a surface profile of the lower exterior shoulder and the upper protrusion of the sleeve has a surface profile mirroring a surface profile of the upper exterior shoulder.

8. The downhole tool coupling system of claim 4, further comprising an actuator adapter encompassing the drive stem having an upper stop and a lower stop, an actuator having a protrusion located between the upper and lower stops of the actuator adapter.

9. The downhole tool coupling system of claim 3, wherein the lower protrusion is engaged with the lower exterior shoulder when the locking clamp is in the open position.

10. The downhole tool coupling system of claim 1, further comprising a clamp connector for connecting the plurality of locking clamps to each other.

11. The downhole tool coupling system of claim 10, wherein the clamp connector includes a groove configured to guide radial movement of the plurality of clamps between the open position and the locked position.

12. The downhole tool coupling system of claim 1, further comprising a plurality of retainers attached to an internal surface of the sleeve, wherein each retainer is located between two of the plurality of locking clamps.

13. The downhole tool coupling system of claim 12, wherein each locking clamp includes a first protrusion extending from a first sidewall and a second protrusion extending from an opposing second sidewall, and each retainer includes at least one slot for receiving one of the protrusions of each of the adjacent locking clamps.

14. A method for connecting a drive stem and a tool stem, comprising:
  moving a sleeve longitudinally relative to the drive stem from a first position to a second position;
  moving upper and lower exterior shoulders of a plurality of locking clamps radially inwardly from an open position to a locked position as the sleeve moves from the first position to the second position, the plurality of locking clamps at least partially encompassed by the sleeve;
  engaging the tool stem and the drive stem with the plurality of locking clamps as the upper and lower exterior shoulders move radially inwardly, thereby connecting the drive stem to the tool stem in the locked position; and
  transferring torque from the drive stem to the tool stem.

15. The method of claim 14, wherein moving the upper and lower exterior shoulders of a plurality of locking clamps radially inwardly comprises moving the plurality of locking clamps radially along a groove of a clamp connector connecting the plurality of locking members.

16. A downhole tool coupling system, comprising:
  a drive stem;
  a sleeve longitudinally movable relative to the drive stem;
  a plurality of locking clamps at least partially encompassed by the sleeve, the locking clamps radially moveable between an open position and a locked position; and
  a plurality of retainers attached to an internal surface of the sleeve, wherein each locking clamp includes a first protrusion extending from a first sidewall and a second protrusion extending from an opposing second sidewall, each retainer located between two of the plurality of locking clamps and having at least one slot for receiving one of the protrusions of each of the adjacent locking clamps,
  wherein the sleeve is oriented relative to the locking clamps to radially move the locking clamps from the open position to the locked position as the sleeve moves longitudinally from a first position to a second position, each locking clamp having an interior recessed region configured to clamp the drive stem to a tool stem when in the locked position.

17. The downhole tool coupling system of claim 16, wherein each locking clamp has a lower exterior shoulder, the sleeve having a lower protrusion configured to engage the lower exterior shoulder and radially move each locking clamp from the open position to the locked position as the sleeve moves longitudinally from the first position to the second position.

18. The downhole tool coupling system of claim 17, wherein each locking clamp has an upper exterior shoulder, the sleeve having an upper protrusion configured to engage the upper exterior shoulder and radially move each locking clamp from the open position to the locked position as the sleeve moves longitudinally from the first position to the second position.

* * * * *